US012142852B2

(12) United States Patent
Ikeda et al.

(10) Patent No.: US 12,142,852 B2
(45) Date of Patent: Nov. 12, 2024

(54) ANTENNA DEVICE FOR PARALLEL RESONANCE

(71) Applicants: DENSO CORPORATION, Kariya (JP); SOKEN, INC., Nisshin (JP)

(72) Inventors: Masakazu Ikeda, Nisshin (JP); Yuuji Kakuya, Nisshin (JP); Kenichiro Sanji, Nisshin (JP); Nobuyasu Okabe, Kariya (JP)

(73) Assignees: DENSO CORPORATION, Kariya (JP); SOKEN, INC., Nisshin (JP)

( * ) Notice: Subject to any disclaimer, the term of this patent is extended or adjusted under 35 U.S.C. 154(b) by 309 days.

(21) Appl. No.: 17/479,494

(22) Filed: Sep. 20, 2021

(65) Prior Publication Data

US 2022/0006195 A1 Jan. 6, 2022

Related U.S. Application Data

(63) Continuation of application No. PCT/JP2020/002867, filed on Jan. 28, 2020.

(30) Foreign Application Priority Data

Mar. 26, 2019 (JP) ................................ 2019-058817

(51) Int. Cl.
*H01Q 9/04* (2006.01)
*H01Q 1/32* (2006.01)
*H01Q 1/48* (2006.01)

(52) U.S. Cl.
CPC ............... *H01Q 9/045* (2013.01); *H01Q 1/48* (2013.01); *H01Q 1/3283* (2013.01)

(58) Field of Classification Search
CPC ........ H01Q 9/045; H01Q 9/0407; H01Q 1/48; H01Q 1/3283
See application file for complete search history.

(56) References Cited

U.S. PATENT DOCUMENTS 6,549,169 B1 4/2003 Matsuyoshi et al.
8,659,498 B2 * 2/2014 Rothwell ............. H01Q 9/0442 343/876

(Continued)

FOREIGN PATENT DOCUMENTS

JP 2001189615 A 7/2001
JP 2003347838 A 12/2003

(Continued)

OTHER PUBLICATIONS

Machine Translation of JP-2017005663-A (Year: 2017).*
Machine Translation of JP2012049767A (Year: 2012).*

*Primary Examiner* — Raymond R Chai
(74) *Attorney, Agent, or Firm* — Harness, Dickey & Pierce, P.L.C.

(57) ABSTRACT

An antenna device includes: a ground plate; an opposing conductive plate provided with a power supply point installed at a predetermined distance from the ground plate; and a short-circuit portion provided in a central region of the opposing conductive plate and electrically connecting the opposing conductive plate and the ground plate. A parallel resonance at a predetermined target frequency is generated by an inductance provided in the short-circuit portion and a capacitance between the ground plate and the opposing conductive plate; and the ground plate is arranged asymmetrically with respect to the opposing conductive plate.

10 Claims, 11 Drawing Sheets

(56) References Cited

U.S. PATENT DOCUMENTS

| | | | | |
|---|---|---|---|---|
| 11,233,330 | B2 * | 1/2022 | Clauzier | H01Q 9/30 |
| 2001/0045908 | A1 * | 11/2001 | Keilen | H01Q 5/371 343/702 |
| 2008/0048917 | A1 | 2/2008 | Achour et al. | |
| 2008/0258981 | A1 | 10/2008 | Achour et al. | |
| 2012/0313823 | A1 * | 12/2012 | Armstrong | H01Q 21/29 343/700 MS |
| 2013/0002377 | A1 | 1/2013 | Toyao et al. | |
| 2015/0214630 | A1 | 7/2015 | Shimura | |
| 2017/0149137 | A1 | 5/2017 | Ikeda et al. | |
| 2019/0229411 | A1 | 7/2019 | Sugimoto et al. | |
| 2020/0227829 | A1 * | 7/2020 | Jouanlanne | H01Q 9/0421 |
| 2021/0184356 | A1 | 6/2021 | Ikeda et al. | |
| 2021/0234278 | A1 * | 7/2021 | Futagami | H01Q 21/065 |
| 2023/0318192 | A1 * | 10/2023 | Sayama | H01Q 13/12 343/767 |

FOREIGN PATENT DOCUMENTS

| | | | | |
|---|---|---|---|---|
| JP | 2005020301 | A | | 1/2005 |
| JP | 2011204130 | A | | 10/2011 |
| JP | 2012049767 | A | * | 3/2012 |
| JP | 2014003670 | A | | 1/2014 |
| JP | 2015142367 | A | | 8/2015 |
| JP | 2016015688 | A | | 1/2016 |
| JP | 2017005663 | A | * | 1/2017 |
| JP | 2017152878 | A | | 8/2017 |
| JP | 2017153032 | A | | 8/2017 |
| JP | 2018061137 | A | | 4/2018 |
| WO | WO-2011114746 | A1 | | 9/2011 |
| WO | WO-2015049816 | A1 | | 4/2015 |

* cited by examiner (A)

(B)

ANTENNA DEVICE FOR PARALLEL RESONANCE

CROSS REFERENCE TO RELATED APPLICATION

The present application is a continuation application of International Patent Application No. PCT/JP2020/002867 filed on Jan. 28, 2020, which designated the U.S. and claims the benefit of priority from Japanese Patent Application No. 2019-058817 filed on Mar. 26, 2019. The entire disclosures of all of the above applications are incorporated herein by reference.

TECHNICAL FIELD

The present disclosure relates to an antenna device having a flat plate structure.

BACKGROUND

According to a conceivable technique, an antenna device includes a micro-strip antenna (in other words, a patch antenna) and a monopole antenna standing upright on the patch antenna. According to the antenna device, the patch antenna provides the directivity in the direction perpendicular to the flat ground conductor (hereinafter, the ground plate), and the monopole antenna provides the directivity in the direction parallel to the ground plate. According to this configuration, for example, when the ground plate is used in a horizontal position, it is possible to receive both radio waves arriving from the zenith direction and radio waves arriving from the horizontal direction. The radio wave arriving from the zenith direction is, for example, a radio wave from a satellite station. The radio wave from the horizontal direction is, for example, a radio wave from a ground station.

SUMMARY

According to an example embodiment, an antenna device includes: a ground plate; an opposing conductive plate provided with a power supply point installed at a predetermined distance from the ground plate; and a short-circuit portion provided in a central region of the opposing conductive plate and electrically connecting the opposing conductive plate and the ground plate. A parallel resonance at a predetermined target frequency is generated by an inductance provided in the short-circuit portion and a capacitance between the ground plate and the opposing conductive plate; and the ground plate is arranged asymmetrically with respect to the opposing conductive plate.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
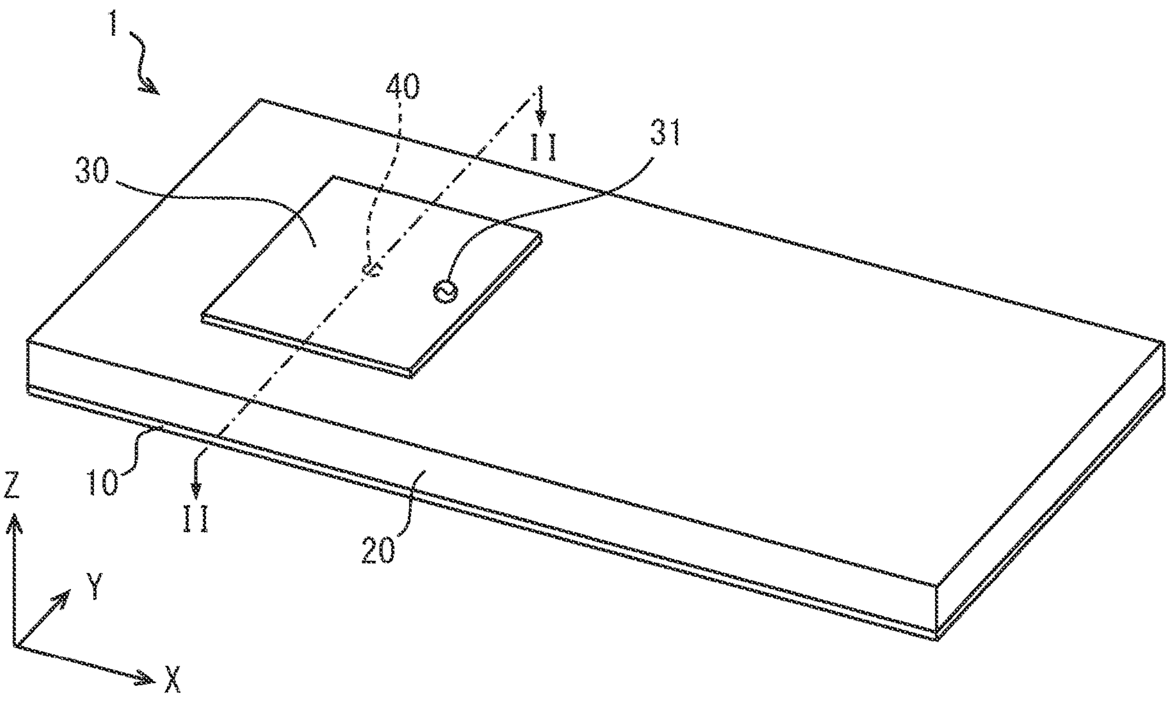
FIG. 1 is an external perspective view showing a configuration of an antenna device.

A conceivable configuration as a comparison includes a monopole antenna for transmitting and receiving radio waves from the horizontal direction. Since the monopole antenna needs to have a length of ¼ wavelength of the radio wave to be transmitted and received, the height of the antenna device (hereinafter referred to as the mounting height) becomes large. The mounting height here refers to the height when the antenna device is mounted on the moving body in a posture in which the plane of the patch antenna is horizontal. It is conceivable that the conductor element as a monopole antenna is shortened by using a coil or the like, but if the height is lowered by the coil or the like, the performance may deteriorate.

In view of the above points, an antenna device is provided with reducing the height thereof for emitting radio waves in the direction perpendicular to the ground and in the direction parallel to the ground.

According to an aspect of the present embodiments, the antenna device includes: a ground plate which is a flat plate-shaped conductor member; an opposing conductive plate provided with a power supply point for electrically connecting to a power supply line and made of a flat plate-shaped conductor member installed at a predetermined distance from the ground plate; and a short-circuit portion provided in a central region of the opposing conductive plate and electrically connecting the opposing conductive plate and the ground plate. Using the inductance provided in the short-circuit portion and the electrostatic capacitance formed by the ground plate and the opposing conductive plate, parallel resonance occurs at a predetermined target frequency. The ground plate is arranged asymmetrically with respect to the opposing conductive plate.

In this type of antenna device, parallel resonance is generated due to an electrostatic capacitance formed between the ground plate and the opposing conductive plate and an inductance included in the short circuit portion. This parallel resonance is generated at a frequency corresponding to that electrostatic capacitance and inductance. Then, due to the vertical electric field generated between the opposing conductive plate and the opposite ground plate according to the parallel resonance, linearly polarized waves whose vibration direction of the electric field is perpendicular to the ground plate are transmitted and received in the direction along the opposing conductive plate.

Further, since the ground plate is arranged asymmetrically with respect to the opposing conductive plate, the amount of current flowing in the ground plate along one direction when viewed from the short-circuit portion and the amount of current flowing in the opposite direction in the ground plate are asymmetric. As a result, the degree to which radio waves radiated by currents flowing in each direction from the short-circuit portion cancel each other is reduced. The radio waves radiated by the current flowing through the ground plate remain uncancelled, and the remaining radio waves propagate into space. That is, radio waves are radiated from a region of the ground plate that is asymmetrical when viewed from the opposing conductive plate (hereinafter, an asymmetrical portion).

It is confirmed by simulation that the current is mainly induced at the edge of the asymmetrical portion. The edge of the ground plate can be regarded as linear. That is, according to the above configuration, the edge of the asymmetrical portion of the ground plate operates as a linear antenna (for example, a pole type antenna). The radio waves radiated from the asymmetrical portion of the ground plate are linearly polarized waves whose electric field vibration direction is parallel to the ground plate. Further, the radio wave radiated from the asymmetrical portion of the ground plate is radiated in the direction orthogonal to the edge portion of the asymmetrical portion. The direction orthogonal to the edge of the asymmetrical portion also includes the direction perpendicular to the ground plate.

As described above, according to the above configuration, radio waves can be radiated in the direction perpendicular to the ground plate and in the direction parallel to the ground plate. Moreover, radiation in a direction parallel to the ground plate is generated by causing parallel resonance due to the capacitance formed between the ground plate and the opposing conductive plate and the inductance provided in the short-circuit portion. Therefore, the height of the antenna device can be reduced.

According to an aspect of the present embodiments, the antenna device includes: a ground plate which is a flat plate-shaped conductor member; an opposing conductive plate provided with a power supply point for electrically connecting to a power supply line and made of a flat plate-shaped conductor member installed at a predetermined distance from the ground plate; and a short-circuit portion provided in a central region of the opposing conductive plate and electrically connecting the opposing conductive plate and the ground plate. Using the inductance provided in the short-circuit portion and the electrostatic capacitance formed by the ground plate and the opposing conductive plate, parallel resonance occurs at a predetermined target frequency. The short-circuit portion is formed at a position spaced apart by a predetermined amount from the center of the opposing conductive plate.

In this configuration, linearly polarized waves having the vibration direction of the electric field perpendicular to the ground plate are transmitted and received in the direction along the opposite conductive plate by using the parallel resonance of the capacitance formed between the ground plate and the opposing conductive plate and the inductance provided in the short circuit portion.

Further, in this configuration, since the short-circuit portion is arranged at a position deviated from the center of the opposing conductive plate, the symmetry of the current distribution flowing through the opposing conductive plate is broken, and the degree of cancellation of the radio waves radiated from the short-circuited portion in each direction is reduced. As a result, radio waves are radiated from the opposing conductive plate in the direction perpendicular to the opposing conductive plate. Since the opposing conductive plate is arranged to face the ground plate, the direction perpendicular to the opposing conductive plate corresponds to the direction perpendicular to the ground plate. That is, according to the above configuration, radio waves can be radiated in the direction perpendicular to the ground plate and in the direction parallel to the ground plate, respectively. Moreover, radiation in a direction parallel to the ground plate is generated by causing parallel resonance due to the capacitance formed between the ground plate and the opposing conductive plate and the inductance provided in the short-circuit portion. Therefore, the height of the antenna device can be reduced.

First Embodiment

Hereinafter, a first embodiment of the present disclosure will be described with reference to the drawings. In the following, members having the same function will be designated by the same reference numerals, and the description thereof will be omitted. When only a part of the configuration is described, the configuration described in the preceding embodiment can be applied to other parts.

Figure 2:
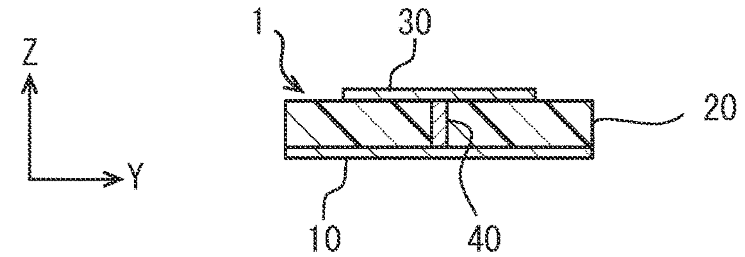
FIG. 2 is a cross-sectional view of the antenna device taken along line II-II in FIG. 1.

FIG. 1 is an exterior perspective view illustrating an example of a schematic structure of an antenna device 1 according to the present embodiment. FIG. 2 is a cross sectional view of the antenna device 1 along the line II-II illustrated in FIG. 1. The antenna device 1 is used by being mounted on a moving body such as a vehicle.

The antenna device 1 is configured to transmit and receive radio waves at a predetermined target frequency. Of course, as another mode, the antenna device 1 may be used for only either one of transmission and reception. Since transmission and reception of radio waves are reversible, a configuration capable of transmitting radio waves at a predetermined frequency is also similar to a configuration capable of receiving radio waves at the predetermined frequency.

Herein, the operating frequency is, for example, 2.45 GHz. Of course, the target frequency may be appropriately designed, and target frequencies may be, for example, 300 MHz, 760 MHz, 850 MHz, 900 MHz, 1.17 GHz, 1.28 GHz, 1.55 GHz, 5.9 GHz, or the like. The antenna device 1 can transmit and receive not only the target frequency but also radio waves having a frequency within a predetermined range determined with the target frequency as a reference. For example, the antenna device 1 is configured to be capable of transmitting and receiving frequencies belonging to the band from 2400 MHz to 2500 MHz (hereinafter, 2.4 GHz band).

That is, the antenna device 1 can transmit and receive radio waves in frequency bands used in short-range wireless communication such as Bluetooth Low Energy (Bluetooth is a registered trademark), Wi-Fi (registered trademark), ZigBee (registered trademark), and the like. In other words, the antenna device 1 is configured to be able to transmit and receive radio waves in the frequency band (so-called ISM band) specified by the International Telecommunication Union for general use in the industrial, scientific, and medical fields.

Hereinafter, "λ" represents the wavelength of the radio wave of the target frequency (hereinafter, also referred to as the target wavelength). For example, "λ/2" and "0.5λ" refer to a half of the length of the target wavelength, and "λ/4" and "0.25λ" refer to the length of one quarter of the target wavelength. The wavelength of the 2.4 GHz radio wave (that is, λ) in vacuum and air is 125 mm.

The antenna device 1 is connected with a wireless device that is not shown via, for example, a coaxial cable, and a signal received by the antenna device 1 is sequentially output to the wireless device. The antenna device 1 converts an electric signal input from the wireless device into a radio wave and emits the radio wave into space. The wireless device uses signals received by the antenna device 1, and also supplies high-frequency power corresponding to transmission signals to the antenna device 1.

In the present embodiment, description is made on the example that the antenna device 1 and the wireless device are connected by the coaxial cable, alternatively, another communication cable such as a supply line may be used for connection. The antenna device 1 and the wireless device may be connected via a matching circuit, a filter circuit, or the like other than the coaxial cable. The antenna device 1 may be integrally configured with the wireless device. For example, the antenna device 1 may be realized on a printed circuit board on which a modulation/demodulation circuit or the like is mounted.

Hereinafter, a specific structure of the antenna device 1 will be described. As shown in FIG. 1, the antenna device 1 includes a ground plate 10, a support plate 20, an opposing conductive plate 30, and a short-circuit portion 40. For convenience, each part will be described below with the side where the opposing conductive plate 30 is provided with respect to the ground plate 10 as the upper side for the antenna device 1. That is, the direction from the ground plate 10 to the opposing conductive plate 30 corresponds to the upward direction for the antenna device 1. The direction from the opposing conductive plate 30 toward the ground plate 10 corresponds to the downward direction for the antenna device 1.

The ground plate 10 is a conductive member having a plate shape and made of conductor such as copper. The ground plate 10 is provided along the lower side surface of the support plate 20. The plate shape here also includes a thin film shape such as a metal foil. That is, the ground plate 10 may be a pattern formed on the surface of a resin plate such as a printed wiring board by electroplating or the like. The ground plate 10 is electrically connected to the external conductor of the coaxial cable and provides the ground potential (in other words, ground) in the antenna device 1.

The ground plate 10 is formed in a rectangular shape. The length of the short side of the ground plate 10 is electrically set to a value corresponding to 0.4λ, for example. Further, the length L of the long side of the ground plate 10 is electrically set to 1.2λ. In this case, the electrical length is an effective length in consideration of a fringing electric field, a wavelength shortening effect by a dielectric substance, and the like. When the support plate 20 is formed by using a dielectric material having a relative permittivity of 4.3, the wavelength on the surface of the ground plate 10 is about 60 mm due to the wavelength shortening effect of the dielectric material as the support plate 20. Therefore, the length electrically corresponding to 1.2λ is 72 mm.

The X-axis shown in various drawings such as FIG. 1 represents the longitudinal direction of the ground plate 10, the Y-axis represents the lateral direction of the ground plate 10, and the Z-axis represents the vertical direction. A three-dimensional coordinate system including the X axis, the Y axis, and the Z axis is a concept for describing the configuration of the antenna device 1. As another aspect, when the ground plate 10 has a square shape, the direction along any one side can be the X-axis. Further, when the main plate 10 is circular, an arbitrary direction parallel to the ground plate 10 can be set as the X-axis. The Y-axis may be in a direction parallel to the ground plate 10 and orthogonal to the X-axis. When the ground plate 10 has a shape such as a rectangle or an ellipse in which a longitudinal direction and a lateral direction exist, the longitudinal direction can be the X-axis direction.

The size of the ground plate 10 may be changeable as appropriate. The length of one side of the ground plate 10 may be set to a value electrically smaller than one wavelength (for example, ⅓ of a target wavelength). Further, the shape of the ground plate 10 viewed from above (hereinafter referred to as a planar shape) may be appropriately changed. Here, as an example, the plane shape of the ground plate 10 is a rectangular shape, alternatively, as another aspect, the plane shape of the ground plate 10 may be a square shape or another polygonal shape. For example, the ground plate 10 may have a square shape in which one side is electrically set to a value corresponding to one wavelength.

It may be preferable that the ground plate 10 has a line-symmetrical shape (hereinafter, a bi-directional line-symmetric shape) with each of two straight lines orthogonal to each other as axes of symmetry. The bidirectional line symmetrical shape refers to a figure that is line-symmetric with a first straight line as an axis of symmetry, and that is further line-symmetric with respect to a second straight line that is orthogonal to the first straight line. The bidirectional line symmetrical shape corresponds to, for example, an ellipse, a rectangle, a circle, a square, a regular hexagon, a regular octagon, a rhombus, or the like. The ground plate 10 may be preferably formed to have a size larger than a circle having a diameter of one wavelength. The planar shape of a member refers to the shape of the member as viewed from above. An edge portion of the ground plate 10 may be partially or entirely formed in a meander shape. The bidirectional line-symmetrical shape also includes a shape in which minute irregularities (about several mm) may be provided at the edge of the bidirectional line-symmetrical shape. The unevenness provided on the edge of the ground plate 10 and the slit formed at a position away from the edge of the ground plate 10 may be negligible as long as they do not affect the antenna operation. The same applies to the point-symmetrical shape.

The support plate 20 is a plate-shaped member for arranging the ground plate 10 and the opposing conductive plate 30 so as to face each other at a predetermined interval. The support plate 20 has a rectangular flat plate shape, and a size of the support plate 20 is substantially the same as a size of the ground plane 10 in plan view. The support plate 20 is realized by using a dielectric material having a predetermined relative permittivity, such as glass epoxy resin. Here, as an example, the support plate 20 is realized by using a glass epoxy resin having a relative permittivity of 4.3 (in other words, FR4: Flame Retardant Type 4).

In the present embodiment, as an example, the thickness H1 of the support plate 20 is formed to be, for example, 1.5 mm. The thickness H1 of the support plate 20 corresponds to the distance between the ground plate 10 and the opposing conductive plate 30. By adjusting the thickness H1 of the support plate 20, the distance between the opposing conductive plate 30 and the ground plate 10 can be adjusted. The specific value of the thickness H1 of the support plate 20 may be appropriately determined by simulations or experiments. The thickness H1 of the support plate 20 may be 2.0 mm, 3.0 mm, or the like. The wavelength of the support plate 20 is about 60 mm due to the wavelength shortening effect of the dielectric material. Therefore, the value of 1.5 mm in thickness electrically corresponds to 1/40 of the target wavelength (that is, λ/40).

The support plate 20 may fulfill the above-mentioned function, and the shape of the support plate 20 can be changed as appropriate. A configuration for disposing the opposing conductive plate 30 to face the ground plate 10 may be a plurality of columns. Further, in the present embodiment, a configuration in which a resin as a support plate 20 is filled is adopted between the ground plate 10 and the opposing conductive plate 30, alternatively, the present embodiment may not be limited to this. The space between the ground plate 10 and the opposing conductive plate 30 may be hollow or vacuum. The support plate 20 may have a honeycomb structure, for example. In addition, the structures exemplified above may be combined. When the antenna device 1 is realized using a printed wiring board, a plurality of conductor layers included in the printed wiring board may be used as the ground plate 10 and the opposing conductive plate 30, and a resin layer separating the conductor layers may be used as the support plate 20.

The thickness H1 of the support plate 20 also functions as a parameter for adjusting a length of a short-circuit portion 40 (in other words, an inductance provided by the short-circuit portion 40), as described later. The interval H1 also functions as a parameter for adjusting the capacitance formed by the ground plate 10 and the opposing conductive plate 30 facing each other.

The opposing conductive plate 30 is a conductive member having a plate shape and made of conductor such as copper. As described above, the plate shape here also includes a thin film shape such as copper foil. The opposing conductive plate 30 is arranged so as to face the ground plate 10 via the support plate 20. Similar to the ground plate 10, the opposing conductive plate 30 may also have a pattern formed on the surface of a resin plate such as a printed wiring board. The term "parallel" here may not be limited to perfect parallel. The opposing conductive plate 40 may be inclined from several degrees to about ten degrees with respect to the ground plate 50. That is, the term "parallel" includes a substantially parallel state.

By arranging the opposing conductive plate 30 and the ground plate 10 so as to face each other, a capacitance is formed according to the area of the opposing conductive plate 30 and the distance between the opposing conductive plate 30 and the ground plate 10. The opposing conductive plate 30 is formed to have a size that forms a capacitance that resonates in parallel with the inductance of the short-circuit portion 40 at a target frequency. The area of the opposing conductive plate 30 may be appropriately designed to provide the desired capacitance (and thus to operate at the target frequency). For example, the opposing conductive plate 30 is electrically formed in a square shape having a side of 12 mm. Since the wavelength on the surface of the opposing conductive plate 30 is about 60 mm due to the wavelength shortening effect of the support plate 20, the value of 12 mm electrically corresponds to 0.2λ. Of course, the length of one side of the opposing conductive plate 30 may be changed as appropriate, and may be 14 mm, 15 mm, 20 mm, 25 mm, or the like.

Here, the shape of the opposing conductive plate 30 is square as an example, alternatively, as another configuration, the planar shape of the opposing conductive plate 30 may be circular, regular octagon, regular hexagon, or the like. Further, the opposing conductive plate 30 may have a rectangular shape or an oblong shape. The opposing conductive plate 30 may preferably have a bidirectional line-symmetrical shape. It may be preferable that the opposing conductive plate 30 is a point-symmetrical figure such as a circle, a square, a rectangle, and a parallelogram.

The opposing conductive plate 30 may be provided with slits or may have rounded corners. For example, a notch as a degenerate separation element may be provided at a pair of diagonal portions. An edge portion of the counter conductor plate 30 may be partially or entirely formed in a meander shape. Irregularities provided at the edge portion of the counter conductor plate 30 that do not affect the operation can be ignored.

A power supply point 31 is formed at an arbitrary position on the opposing conductive plate 30. The power supply point 31 is a portion where the inner conductor of the coaxial cable and the opposing conductive plate 30 are electrically connected. The inner conductor of the coaxial cable corresponds to the power supply line. The power supply point 31 may be provided at a position where the characteristic impedance of the coaxial cable and the impedance of the antenna device 1 at the target frequency can be matched. In other words, the power supply point 31 may be provided at a position where the return loss becomes a predetermined allowable level. The power supply point 31 may be arranged at an arbitrary position, for example, in the central region of the edge portion of the opposing conductive plate 20.

As a power supply method to the counter conductor plate 30, various methods such as a direct connection power supply method and an electromagnetic coupling method can be adopted. The direct connection power supply method refers to a method in which a micro-strip line, a conductor pin, a via, or the like electrically connected to the internal conductor of the coaxial cable (that is, for power supply) is directly connected to the counter conductor plate 30. In the direct power supply method, the connection point between the micro-strip line or the like and the opposing conductive plate 30 corresponds to the power supply point 31 for the opposing conductive plate 30. The electromagnetic coupling method refers to a power supply method using electromagnetic coupling between a micro-strip line or the like for power supply and the counter conductor plate 30.

Figure 3:
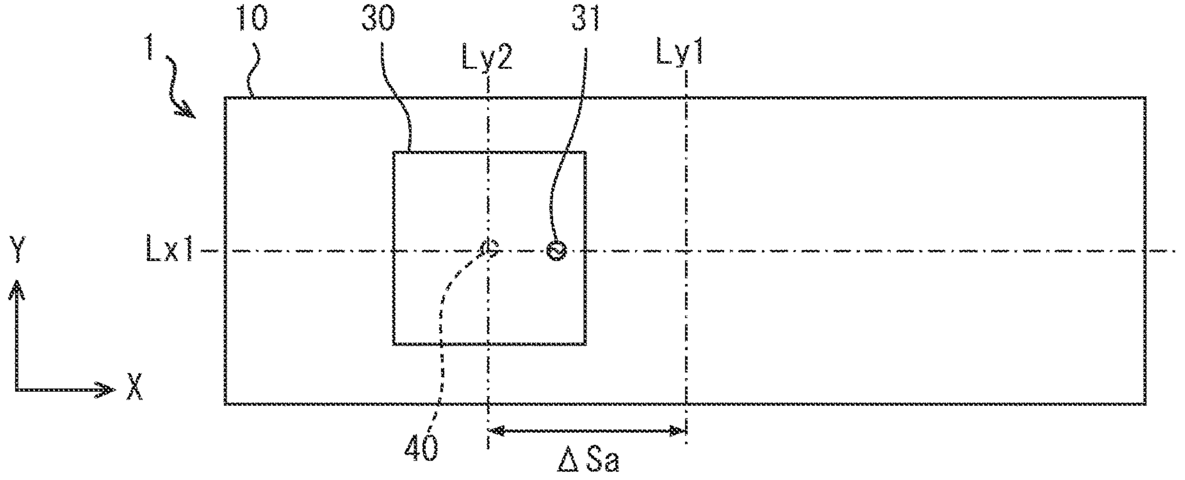
FIG. 3 is a diagram for explaining the positional relationship between the ground plate and the opposing conductive plate.

As shown in FIG. 3, the counter conductor plate 30 is disposed to face the ground plate 10 in such a manner that one set of opposite sides is parallel to the X axis and another set of opposite sides is parallel to the Y axis. Here, the center thereof is arranged so as to deviate from the center of the ground plate 10 by a predetermined amount in the X-axis direction. Specifically, the opposing conductive plate 30 is arranged so that its center is electrically deviated from the center of the ground plate 10 in the X-axis direction by 1/20 (that is, 0.05λ) of the target wavelength. According to another viewpoint, this configuration corresponds to a configuration in which the ground plate 10 is arranged asymmetrically with respect to the opposing conductive plate 30.

The distance between the center of the ground plate 10 (hereinafter, the ground plate center) and the center of the opposing conductive plate 30 in the X-axis direction (hereinafter, the ground plate offset amount ΔSa) may not be limited to 0.05λ. The ground plate offset amount ΔSa may be 0.08λ, 0.04λ, 0.25λ, or the like. The ground plate offset amount ΔSa may be set to λ/8. The ground plate offset amount ΔSa can be appropriately changed within a range in which the opposing conductive plate 30 does not protrude to the outside of the ground plate 10 when viewed from above. The opposing conductive plate 30 is arranged so that at least the entire region (in other words, the entire surface) faces the ground plate 10. The ground plate offset amount ΔSa corresponds to the amount of deviation between the center of the ground plate 10 and the center of the opposing conductive plate 30.

In FIG. 3, the support plate 20 is drawn to be transparent (that is, not shown) in order to clarify the positional relationship between the ground plate 10 and the opposing conductive plate 30. The alternate long and short dash line Lx1 shown in FIG. 3 represents a straight line passing through the center of the ground plate 10 and parallel to the X axis, and the alternate long and short dash line Ly1 represents a straight line passing through the center of the ground plate 10 and parallel to the Y axis. The alternate long and short dash line Ly2 represents a straight line that passes through the center of the opposing conductive plate 30 and is parallel to the Y axis. From another point of view, the straight line Lx1 corresponds to the axis of symmetry for the ground plate 10 and the opposing conductive plate 30. The straight line Ly1 corresponds to the axis of symmetry for the ground plate 10. The straight line Ly2 corresponds to the axis of symmetry for the opposing conductive plate 30.

Since the opposing conductive plate 30 is arranged so as to be displaced by a predetermined amount in the X-axis direction from a position concentric with the ground plate 10, the alternate long and short dash line Lx1 also passes through the center of the opposing conductive plate 30. That is, the alternate long and short dash line Lx1 is a straight line parallel to the X axis and corresponds to a straight line passing through the center of the ground plate 10 and the opposing conductive plate 30. The intersection of the straight line Lx1 and the straight line Ly1 corresponds to the center of the ground plate, and the intersection of the straight line Lx1 and the straight line Ly2 corresponds to the center of the opposing conductive plate 30 (hereinafter, the conductive plate center). The conductive plate center corresponds to the center of gravity of the opposing conductive plate 30. Since the opposing conductive plate 30 has a square shape in the present embodiment, the center of the conductor plate corresponds to the intersection of two diagonal lines of the opposing conductive plate 30. The arrangement mode in which the ground plate 10 and the opposing conductive plate 30 are concentric corresponds to an arrangement mode in which the center of the opposing conductive plate 30 and the center of the ground plate 10 overlap in top view.

The short-circuit portion 40 is a conductive member that electrically connects the ground plate 10 and the opposing conductive plate 30. It is sufficient that the short-circuit portion 40 is provided by using a conductive pin (hereinafter, short-circuit pin). An inductance of the short-circuit portion 40 can be adjusted by adjusting a diameter and a length of the short-circuit pin serving as the short-circuit portion 40.

The short-circuit portion 40 may be a linear member having one end electrically connected to the ground plate 10 and the other end electrically connected to the opposing conductive plate 30. When the antenna device 1 is realized using a printed wiring board as a base material, a via hole provided on the printed wiring board can be used as the short-circuit portion 40.

The short-circuit portion 40 is provided, for example, so as to be located at a center of the conductor plate center. Note that a position where the short-circuit portion 40 is formed may not always exactly coincide with the center of the opposing conductive plate 40. The short-circuit portion 40 may be deviated from the center of the conductor plate by about several millimeters. The short-circuit portion 40 may be formed in a center region of the opposing conductive plate 30. The central region of the opposing conductive plate 30 refers to a region inside the line connecting the points that internally divide the conductor plate from the center to the edge portion in a ratio of 1:5. From another point of view, the central region corresponds to a region where concentric figures, in which the opposing conductive plate 30 is similarly reduced to about 1/6, overlap.

<Operation of the Antenna Device 1>

The operation of the antenna device 1 configured as described above will be described. The opposing conductive plate 30 in the antenna device 1X is short-circuited to the ground plate 10 by a short-circuit portion 40 provided in the center region of the opposing conductive plate 30, and the area of the opposing conductive plate 30 is equal to an area for forming an electrostatic capacitance that resonates in parallel with the inductance of the short-circuit portion 40 at the target frequency.

For this reason, a parallel resonance (so-called an LC parallel resonance) occurs due to an energy exchange between the inductance and the capacitance, and a vertical electric field perpendicular to the ground plate 10 and the opposing conductive plate 30 is generated between the ground plate 10 and the opposing conductive plate 30. This vertical electric field propagates from the short-circuit portion 40 toward the edge of the opposing conductive plate 30, and at the edge of the opposing conductive plate 30, the vertical electric field becomes a linearly polarized wave (i.e., ground plate vertically polarized wave) having a polarization plane perpendicular to the ground plate 10 and propagates in space. The ground plate vertically polarized wave here refers to a radio wave in which the vibration direction of the electric field is perpendicular to the ground plate 10 and the opposing conductive plate 30. When the antenna device 1 is used in a posture parallel to the horizontal plane, the ground plate vertically polarized wave refers to a polarized wave in which the oscillation direction of the electric field is perpendicular to the ground (so-called a vertically polarized wave).

Figure 4:
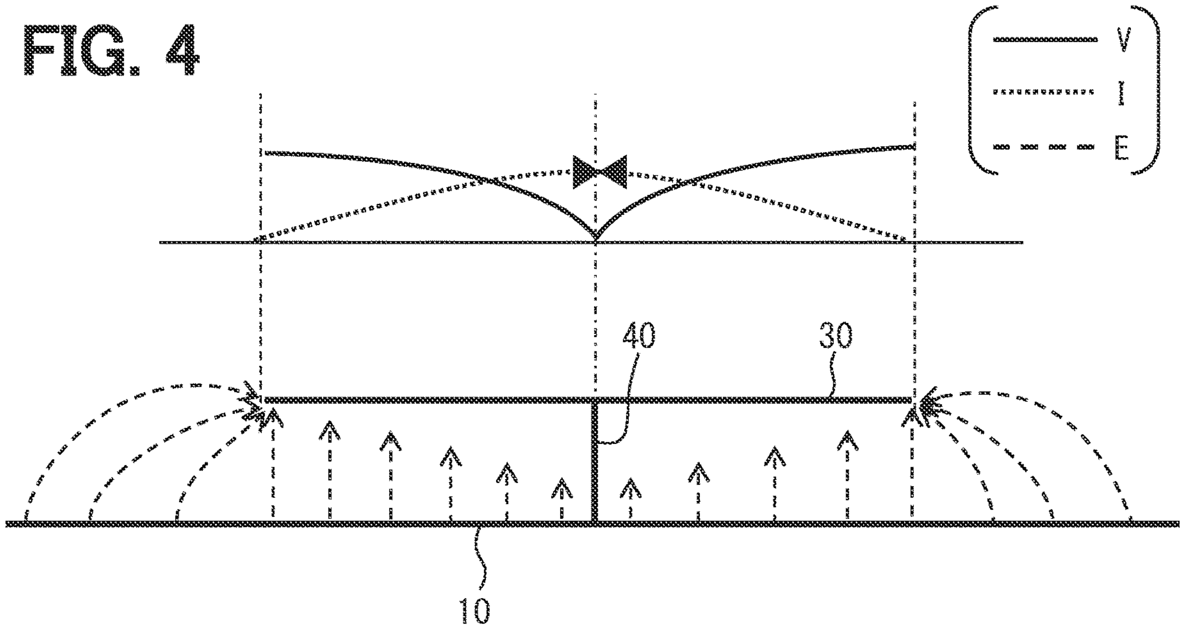
FIG. 4 is a diagram illustrating a current distribution, a voltage distribution, and an electric field distribution in the vicinity of the opposing conductive plate.
Figure 5:
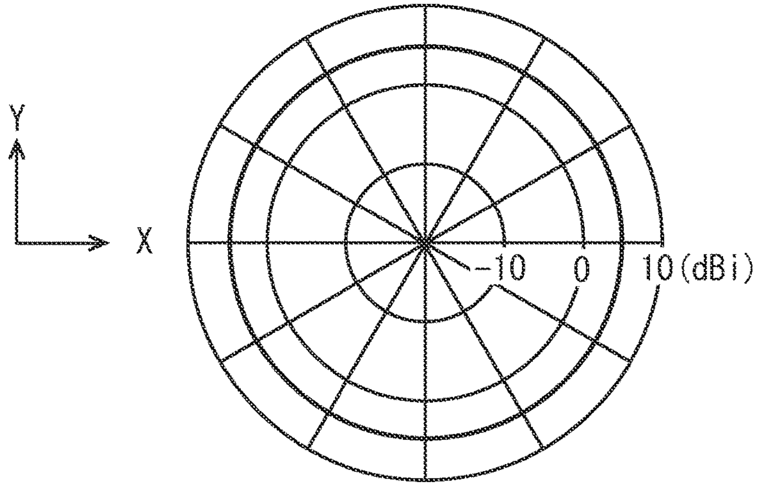
FIG. 5 is a diagram showing radiation characteristics in the LC resonance mode in the XY plane.

As shown in FIG. 4, the propagation direction of the vertical electric field is symmetrical with respect to the short-circuit portion 40. Therefore, as shown in FIG. 5, the antenna device 1 has the same gain in all directions in the horizontal plane. In other words, at the target frequency, the antenna device 1 has a directivity in all directions from the center region toward the edge of the opposing conductive plate 30 (that is, an antenna horizontal direction). When the ground plate 10 is disposed so as to be horizontal, the antenna device 1 functions as an antenna having a main beam in the horizontal direction. The horizontal plane of the antenna here refers to a plane parallel to the ground plate 10 and the opposing conductive plate 30. The horizontal direction of the antenna here refers to the direction from the center of the opposing conductive plate 30 toward the edge thereof. According to another viewpoint, the antenna horizontal direction refers to a direction perpendicular to a perpendicular line to the ground plate 10 passing through the center of the opposing conductive plate 30. The antenna horizontal direction corresponds to a lateral direction of the antenna device 1.

Figure 6:
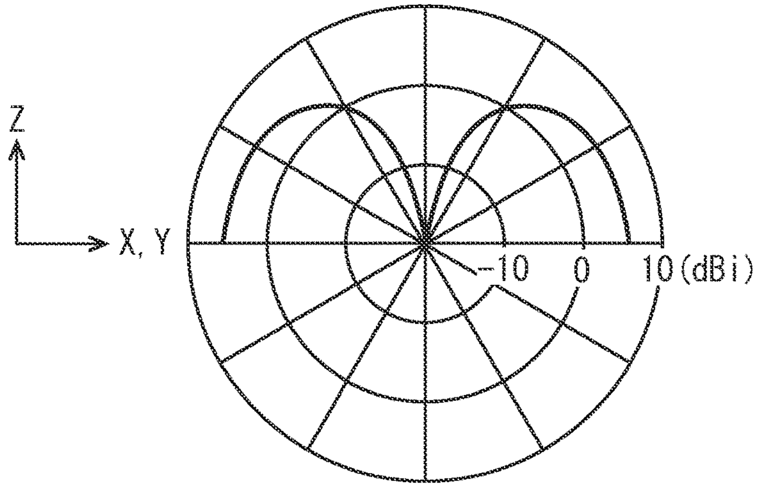
FIG. 6 is a diagram showing radiation characteristics in the LC resonance mode in the XZ plane and the YZ plane.

Since the short-circuit portion 40 is disposed at the center of the opposing conductive plate 30, a current that flows through the opposing conductive plate 30 is symmetric about the short-circuit portion 40. Therefore, a radio wave in the antenna height direction generated by a current that flows through the opposing conductive plate 30 in a certain direction from the center of the opposing conductive plate 30 is canceled by a radio wave generated by the current that flows in the opposite direction. That is, the current excited by the opposing conductive plate 30 does not contribute to the emission of radio waves. Therefore, as shown in FIG. 6, radio waves are not emitted upward from the antenna. Hereinafter, for convenience, a mode in which the antenna device 1 operates by the LC parallel resonance of the capacitance formed between the ground plate 10 and the opposing conductive plate 30 and the inductance of the short-circuit portion 40 is referred to as an LC resonance mode. The LC resonance mode corresponds to an operation mode using a voltage oscillation of the opposing conductive plate 30 with respect to the ground plate 10. The LC resonance mode corresponds to a zeroth-order resonance mode. The antenna device 1 in the LC resonance mode corresponds to a voltage antenna.

Figure 7:
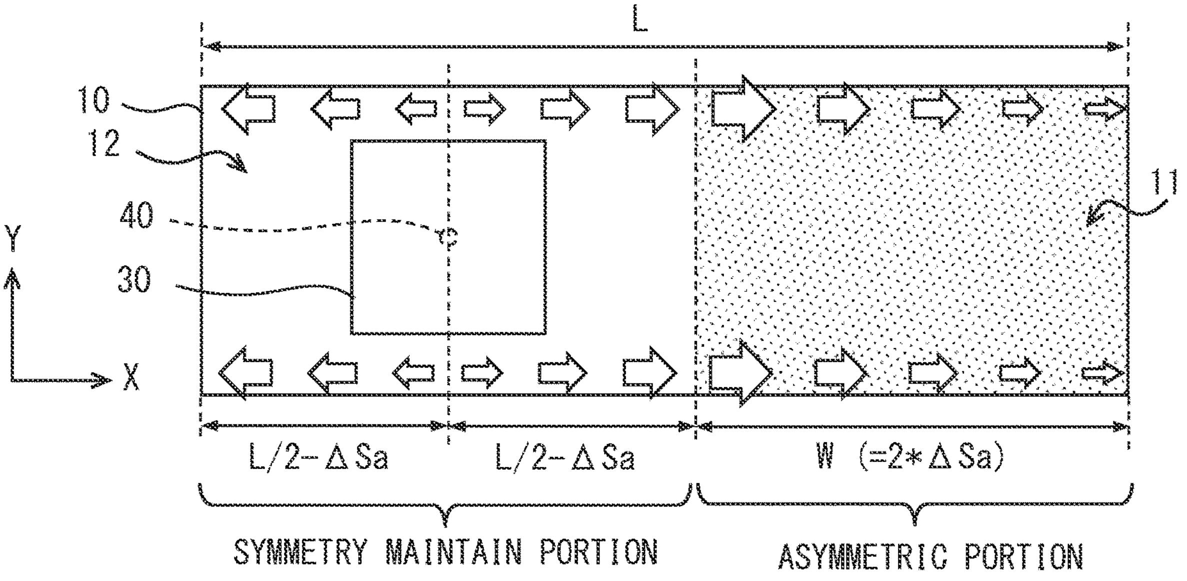
FIG. 7 is a diagram for explaining the operating principle of the ground plate excitation mode.
Figure 8:
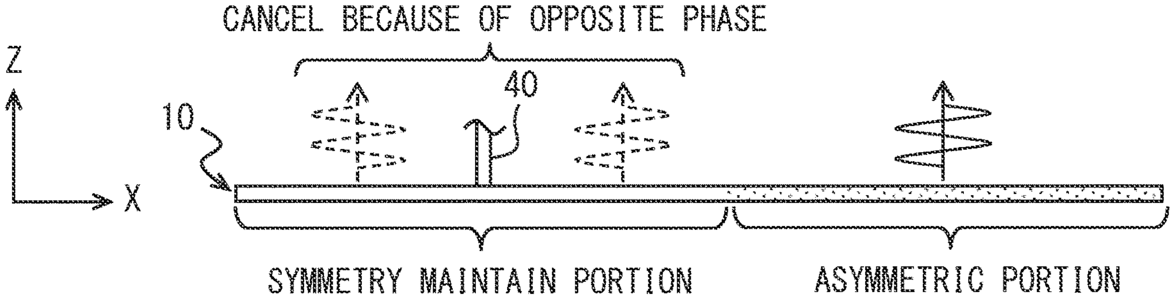
FIG. 8 is a diagram for explaining the operating principle of the ground plate excitation mode.

Further, the antenna device 1 also radiates radio waves from the ground plate 10 due to the fact that the ground plate 10 is asymmetrically formed when viewed from the opposing conductive plate 30. Specific examples are as follows. In the antenna device 1 of the present embodiment, the opposing conductive plate 30 is arranged so as to be electrically deviated from a position concentric with the ground plate 10 in the X-axis direction by 1/20 (that is, λ/20) of the target wavelength. According to the embodiment in which the ground plate offset amount ΔSa is set to λ/20, the region within λ/10 from the edge portion in the X-axis direction is the asymmetrical portion 11 for the opposing conductive plate 30. The asymmetrical portion 11 here refers to a region of the ground plate 10 that is asymmetrical when viewed from the opposing conductive plate 30. In FIGS. 7 and 8, the asymmetrical portion 11 is hatched with a dot pattern in order to clearly indicate the region. For convenience, the maximum region of the ground plate 10 that has symmetry with respect to the opposing conductive plate 30 is also referred to as the symmetry maintain portion 12. The symmetry maintain portion 12 is set to include a part of the edge portion of the ground plate 10. The length of the symmetry maintain portion 12 from the central region to the end portion in the X-axis direction is (L/2−ΔSa). The center of the symmetry maintain portion 12 and the center of the opposing conductive plate 30 coincide with each other in the top view.

FIG. 7 is a diagram conceptually showing the current flowing through the ground plate 10. As a result of the simulation, it has been confirmed that the current flowing through the ground plate 10 due to the LC parallel resonance mainly flows along the edge of the ground plate 10. In FIG. 7, the magnitude of the arrow represents the amplitude of the current. In FIG. 7, the support plate 20 is drawn to be transparent (that is, not shown).

The current that flows from the opposite conductive plate 30 through the short-circuit portion 40 and into the ground plate 10 flows from the short-circuit portion 40 to both sides of the ground plate 10 in the longitudinal direction. The short-circuit portion 40, which serves as the entrance and exit of the current for the ground plate 10, is provided at the center of the symmetry maintain portion 12 in the longitudinal direction. Therefore, in the symmetry maintain portion 12, the currents flowing from the short-circuit portion 40 toward both ends in the X-axis direction have opposite directions and the same magnitude. Therefore, the electromagnetic wave generated by the current flowing in a certain direction (for example, the X-axis positive direction) from the center of the symmetry maintain portion 12 is cancelled by the electromagnetic wave formed by the current flowing in the opposite direction (for example, the X-axis negative direction) as shown in FIG. 8. Therefore, the radio wave is not substantially emitted from the symmetry maintain portion 12.

However, the radio wave generated by the current flowing through the asymmetrical portion 11 remains without being canceled. In other words, the edge of the asymmetrical portion 11 functions as a radiating element (actually a linear antenna). The radio waves radiated from the ground plate 10 are linearly polarized waves in which the electric field oscillates in a direction parallel to the ground plate 10 (hereinafter referred to as ground plate parallel polarized waves). Specifically, the radio wave radiated from the ground plate 10 is linearly polarized (hereinafter, X-axis parallel polarized wave) in which the vibration direction of the electric field is parallel to the X-axis. Further, the parallel polarization of the ground plate is radiated in a direction orthogonal to the X axis. That is, the parallel polarization of the ground plate is also radiated in the upward direction (hereinafter, the upward direction of the antenna) for the antenna device 1.

Figure 9:
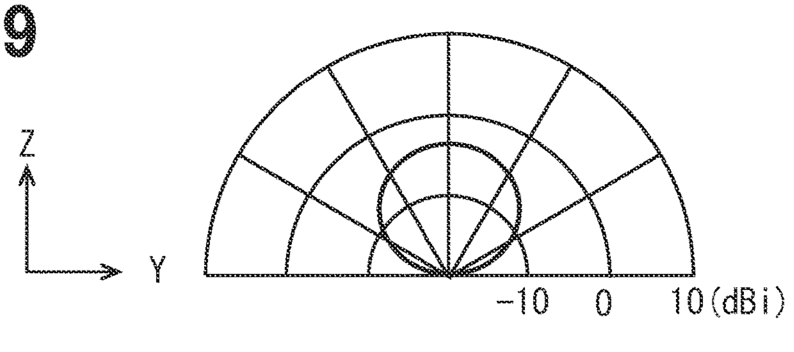
FIG. 9 is a diagram showing radiation characteristics provided by the ground plate excitation mode.

Hereinafter, for convenience, the operation mode using the linear current flowing through the edge of the asymmetrical portion 11 of the ground plate 10 is referred to as the ground plate excitation mode. The ground plate excitation mode corresponds to an operation mode in which linearly polarized waves whose electric field vibrates in the direction in which the asymmetric portion 11 and the symmetry maintain portion 12 are connected (here, the X-axis direction) are radiated in the direction perpendicular to the edge portion. The antenna device 1 as the ground plate excitation mode corresponds to a current-based antenna that radiates radio waves by an induced current. When the antenna device 1 is used in a posture parallel to the horizontal plane, the parallel polarization of the ground plate corresponds to the linear polarization (that is, the horizontal polarization) in which the electric field vibration direction is parallel to the ground. FIG. 9 is a diagram showing a result of simulating the radiation characteristics of the antenna device 1 in which the electric length of the ground plate offset amount ΔSa is set to 0.05λ in the ground plate excitation mode.

As described above, the antenna device 1 of the present embodiment can operate simultaneously in both the LC resonance mode in which the beam is formed in the horizontal direction of the antenna and the ground plate excitation mode in which the beam is formed in the upward direction of the antenna. When the relationship between the length of the asymmetric portion 11 in the X-axis direction (hereinafter, the width W of the asymmetric portion), the gain in the horizontal direction of the antenna, and the gain in the upward direction of the antenna is simulated, it has been confirmed that the ratio between the gain in the plate vertical direction and the gain in the ground plate parallel varies depending on the length of the asymmetric portion 511 in the X-axis direction (hereinafter, the width W of the asymmetric portion). The asymmetric portion width W may be appropriately adjusted so that a desired gain ratio can be obtained.

Figure 10:
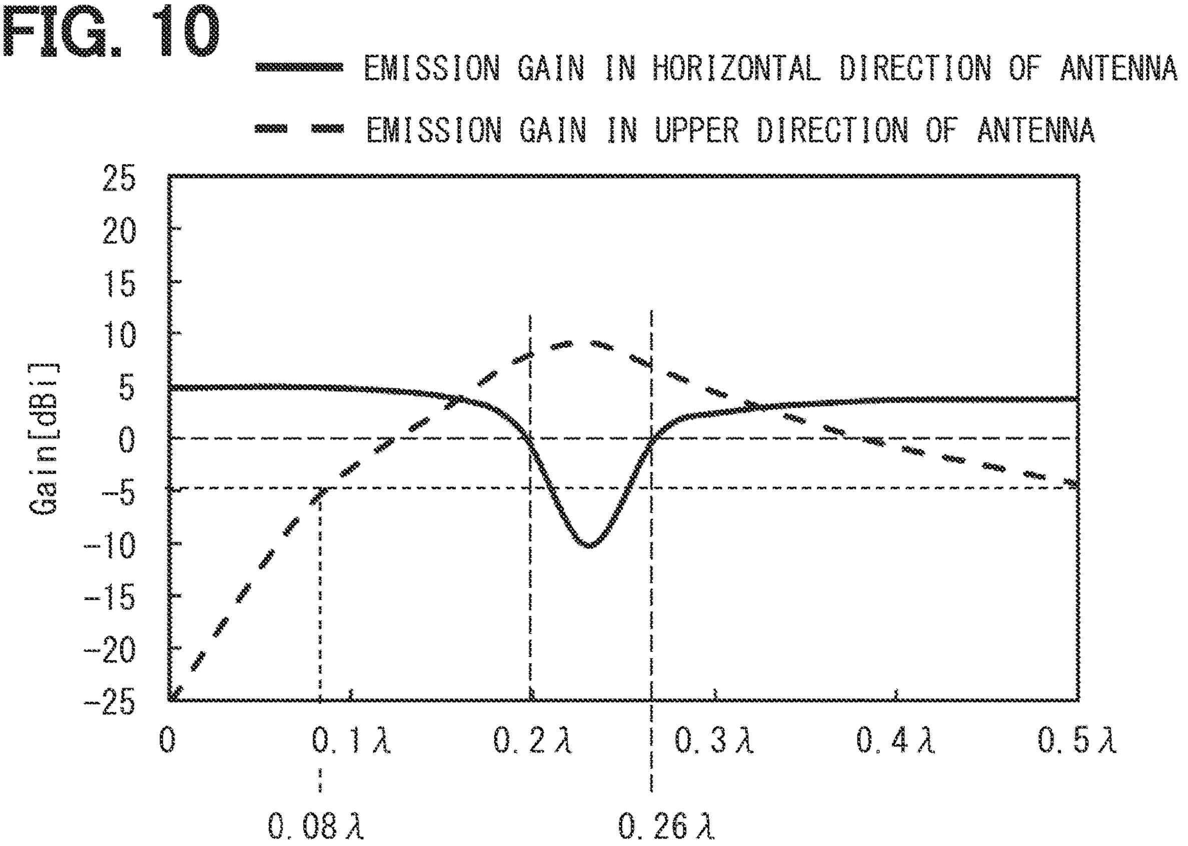
FIG. 10 is a diagram showing a relationship between a gain in the horizontal direction of the antenna, a gain in the upward direction of the antenna, and a width W of an asymmetric portion.

Here, the ratio of the gain in the vertical direction of the ground plate to the gain in the parallel direction of the ground plate may be affected by not only the width W of the asymmetric portion, but also the separation between the ground plate 10 and the back metal body which is a metal member existing on the lower side (in other words, the back side) of the antenna device 1. FIG. 10 shows the characteristics when a conductor plate larger than the ground plate 10 is arranged at a position of 4 mm below the ground plate 10. The asymmetric portion width W is designed based on simulation or the like so that a desired gain ratio can be obtained in consideration of the separation between the back metal body and the ground plate 10. As described above, the asymmetric portion width W is set to 0.1λ here, but as another embodiment, it may be set to 0.25λ. The asymmetric portion width W corresponds to twice the value of the ground plate offset amount ΔSa. Therefore, the configuration in which the asymmetric portion width W is 0.25λ corresponds to the configuration in which the ground plate offset amount ΔSa is set to 0.125λ.

The operation of the antenna device 1 when transmitting radio waves and the operation of the antenna device 1 when receiving radio waves are mutually reversible. That is, according to the antenna device 1, the vertical polarization of the ground plate arriving from the horizontal direction of the antenna can be received, and the parallel polarization of the ground plate arriving from the upper direction of the antenna can be also received.

By operating in the LC resonance mode, the antenna device 1 can transmit and receive the vertical polarization of the ground plate in all directions in the horizontal direction of the antenna. At the same time, the antenna device 1 operates in the ground plate excitation mode, so that the ground plate parallel polarization can be transmitted and received in the upward direction of the antenna. In this way, the antenna device 1 can transmit and receive radio waves having different planes of polarization in directions orthogonal to each other.

Moreover, the antenna device 1 utilizes the parallel resonance of the capacitance formed between the ground plate 10 and the opposing conductive plate 30 and the inductance provided in the short-circuit portion 40 for generating the vertical polarization in the horizontal direction of the antenna. In the conceivable configuration as a comparison, an electric length of λ/4 is required to transmit and receive vertically polarized waves in the horizontal direction of the antenna, whereas the height (In other words, thickness) of the antenna device 1 is about λ/100. That is, the size of the antenna device 1 in the height direction can be reduced.

In addition, the antenna device 1 operates in the ground plate excitation mode because the asymmetrical portion 11 is arranged (actually extended) next to the symmetry maintain portion 12. That is, as a configuration for further adding directivity in the upward direction of the antenna to the antenna device 1 as the LC resonance antenna, the ground plate 10 may be provided at a position asymmetrical with respect to the opposing conductive plate 30. The above-mentioned asymmetrical portion 11 can be realized by using a part of the ground plate 10 included in the LC resonance antenna. Therefore, according to the configuration of the present embodiment, it is possible to reduce the cost required for manufacturing as compared with the case where the antenna for horizontally polarized waves is provided separately from the antenna for vertically polarized waves.

<Usage of the Antenna Device 1>

Figure 11:
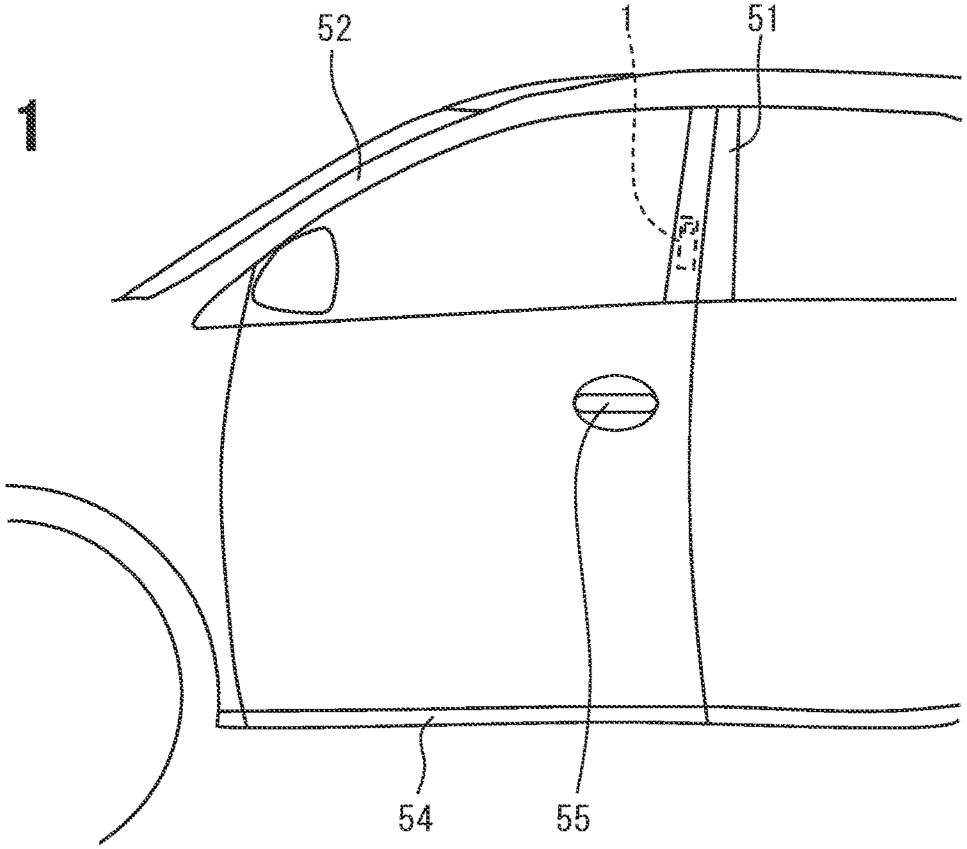
FIG. 11 is a diagram showing an example of an antenna device mounting position and mounting posture on a vehicle.

The antenna device 1 described above, for example, as shown in FIG. 11, may be used with being mounted on the outer surface of the vehicle compartment at the B pillar 51 of the vehicle so that the ground plate 10 faces the surface of the B pillar 51, and the X-axis direction is disposed along the longitudinal direction (in other words, the vehicle height direction) of the B pillar 51. Alternatively, the device 1 may be attached to have the above described posture on an inside portion of the door panel that overlaps with the B pillar 51.

Figure 12:
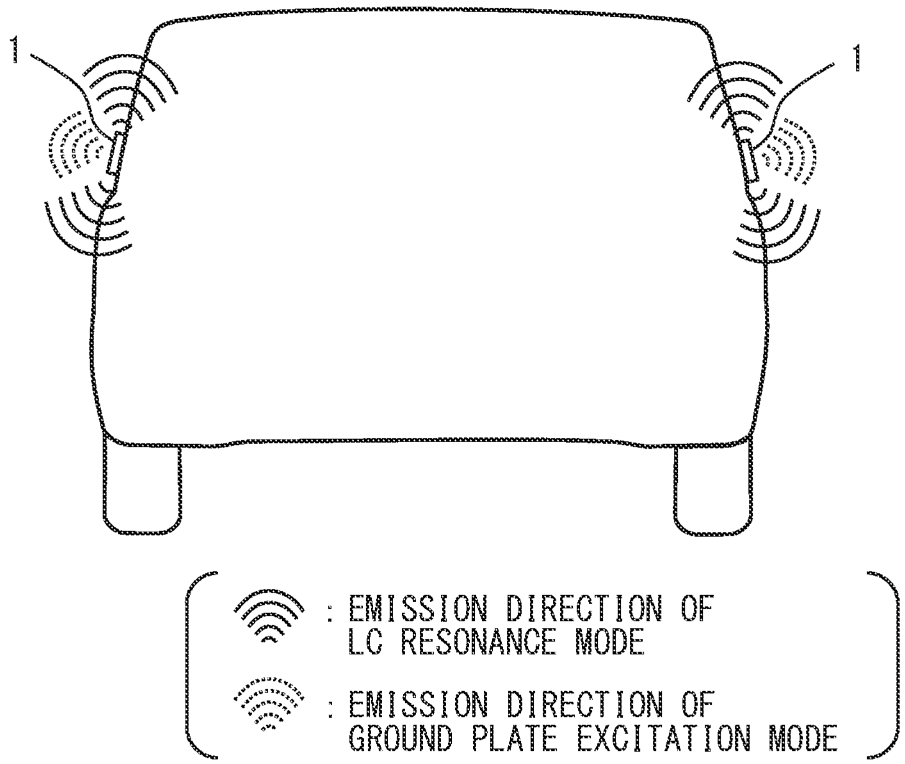
FIG. 12 is a conceptual diagram showing the directivity of the antenna device according to the mounting position and mounting posture shown in FIG. 11.

According to the above mounting posture, the Z-axis direction (in other words, the antenna upward direction) for the antenna device 1 corresponds to the direction orthogonal to the side surface of the vehicle (that is, the vehicle width direction), and the horizontal direction of the antenna is the direction along the vehicle side surface (in other words, a parallel direction). According to the mounting posture, as shown in FIG. 12, directivity can be formed in both the direction parallel to the vehicle side surface portion and the vehicle width direction.

The mounting position and mounting posture of the antenna device 1 may not be limited to the above examples. The antenna device 1 may be attached to an arbitrary position on the outer surface of the vehicle, such as the outer surface of the vehicle compartment at the A-pillar 52 and the C-pillar, the rocker portion (in other words, the side sill) 54, and the inside/vicinity of the outer door handle 55. For example, the antenna device 1 may be housed inside the outer door handle 55 in a posture in which the X-axis direction is along the longitudinal direction of the handle and the Y-axis is along the vehicle height direction.

Here, it may be preferable that the antenna device 1 is attached to the flat metal body portion of the vehicle (hereinafter, the vehicle metal body 50) in a posture in which the ground plate 10 faces the vehicle metal body 50. According to the embodiment in which the antenna device 1 is mounted on the vehicle metal body 50, the vehicle metal body 50 functions as a base plate (hereinafter, a master ground plate) for the ground plate 10 as shown in FIG. 13, and the operation of the antenna device 1 is stable.

Although the first embodiment of the present disclosure has been described above, the present disclosure is not limited to the above-mentioned first embodiment, and various modifications described below are also included in the technical scope of the present disclosure. Furthermore, in addition to the following, various changes can be made within the range that does not deviate from the scope. For example, various modifications to be described below can be implemented in appropriate combination within a scope that does not cause technical inconsistency. In addition, the configurations described in the first embodiment and its modifications can be applied to the disclosed configurations as the second embodiment described later.

Modification 1

Figure 13:
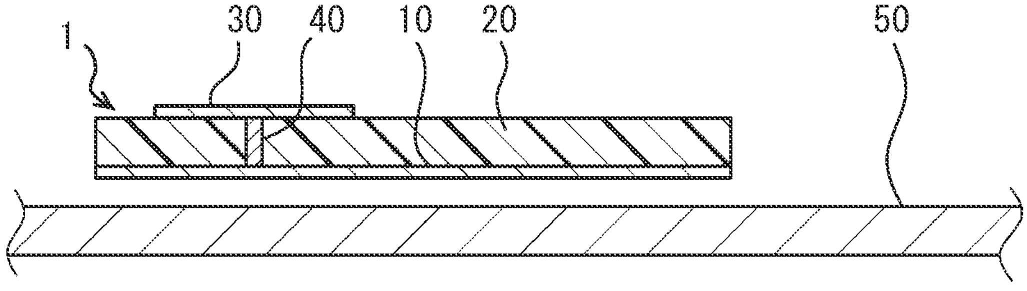
FIG. 13 is a diagram for explaining a more preferable mounting position of the antenna device.

As shown in FIG. 13, the antenna device 1 may include a master ground plate 50*a* larger than the ground plate 10 disposed on the lower side of the ground plate 10. The master ground plate 50*a* may be preferably a conductor member having a length of one wavelength or more in both the X-axis direction and the Y-axis direction. When the ground plate 10 is defined as the first ground plate, the master ground plate 50*a* corresponds to the second ground plate. The conductor member as the master ground plate 50*a* may be a member having a substantially flat surface facing the ground plate 10.

Figure 14:
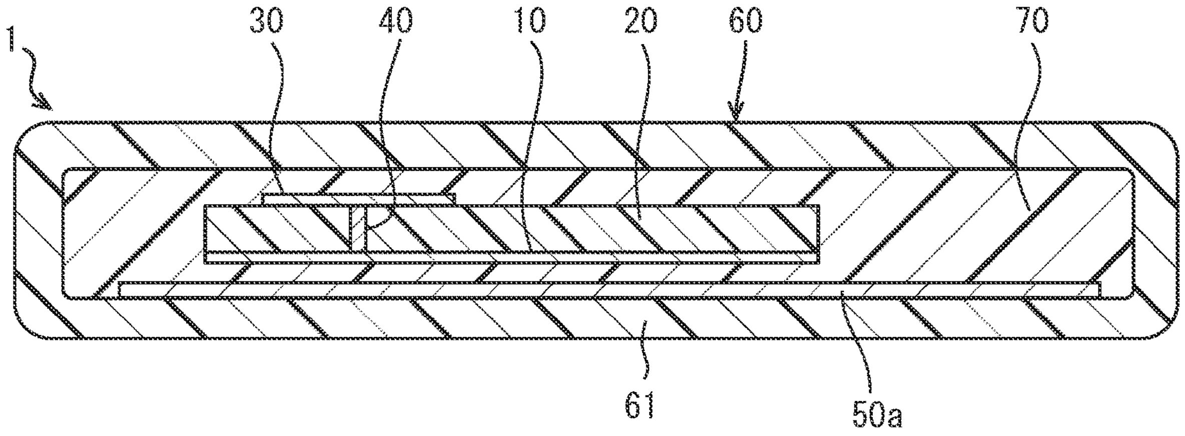
FIG. 14 is a diagram showing a modification example of the antenna device.
Figure 14:
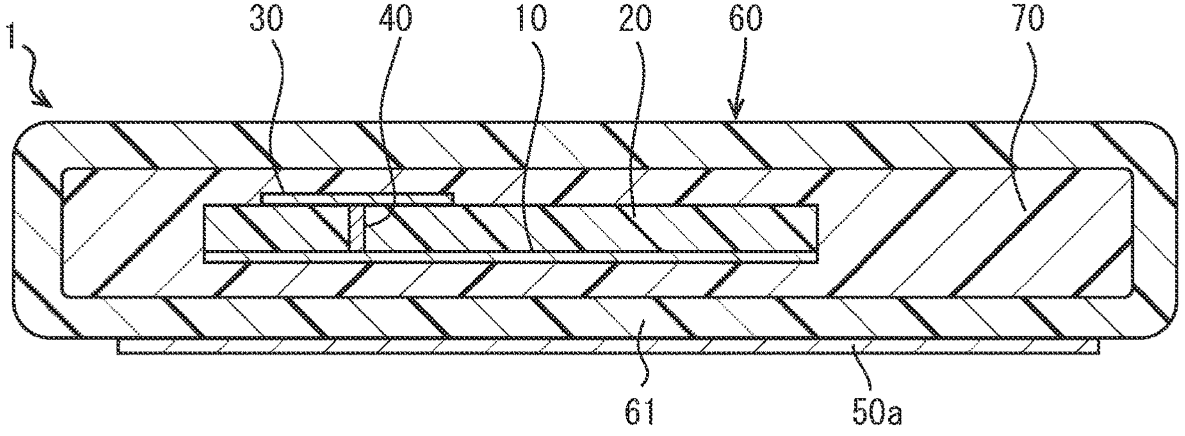

The master ground plate 50*a* is arranged to face the ground plate 10 at a predetermined distance. The master ground plate 50*a* is arranged on the inner bottom surface of the resin case 60 of the antenna device 1, for example, as shown in (A) of FIG. 14. As shown in (B) of FIG. 14, the master ground plate 50*a* may be arranged on the outer bottom surface of the case 60 of the antenna device 1. The case 60 and the master ground plate 50*a* may be integrally formed. Further, the bottom of the case 60 may be made of metal. In that case, the bottom of the metal case corresponds to the master ground plate 50*a*. In addition, the vehicle metal body 50 can be used as the master ground plate 50*a*.

[Second Modification]

As mentioned in the first modification, the antenna device 1 may include a case 60 for accommodating the ground plate 10, the opposing conductive plate 30, and the support plate 20 on which the short-circuit portion 40 is formed. The case 60 is formed by combining, for example, an upper case and a lower case that are vertically separable. The case 60 is constructed using, for example, a polycarbonate (PC) resin. As the material of the case 60, various resins such as synthetic resin obtained by mixing acrylonitrile-butadiene-styrene copolymer (so-called ABS) with PC resin and polypropylene (PP) can be adopted. The case 60 includes a case bottom portion 61, a case side wall portion 62, and a case top plate portion 63. The case bottom portion 61 is configured to provide the bottom of the case 60. The case bottom portion 61 is formed in a flat plate shape. In the case 60, the circuit board 100 is arranged so that the ground plate 10 faces the case bottom portion 61. The distance between the case bottom portion 91 and the ground plate 10 may be preferably set to λ/25 or less.

The case side wall portion 62 is configured to provide the side surface of the case 60, and is put up from the edge portion of the case bottom portion 61 upwardly. The height of the case side wall portion 62 is designed so that, for example, the distance between the inner surface of the case top plate portion 63 and the opposing conductive plate 30 is λ/25 or less. The case top plate portion 63 is configured to provide an upper surface portion of the case 60. The case top plate portion 63 of this embodiment is formed in a flat plate shape. As the shape of the case top plate portion 63, various other shapes such as a dome shape can be adopted. The case top plate portion 63 is configured such that the inner surface faces the upper surface of the support portion 20 (and thus the opposing conductive plate 30).

When the case top plate portion 63 is disposed near the opposing conductive plate 30 as in the above configuration, the vertical electric field radiated by the LC resonance mode is suppressed from wrapping upward from the edge portion of the opposing conductive plate 30, and the radiation gain in the horizontal direction of the antenna can be increased. The term "near the opposing conductive plate 30" refers to, for example, a region in which the distance from the opposing conductive plate 30 is electrically 1/25 or less of the target wavelength. When the case bottom portion 61 is disposed near the ground plate 10 as in the above configuration, the vertical electric field radiated by the LC resonance mode is suppressed from wrapping downward from the edge portion of the ground plate 10, and the radiation gain in the horizontal direction of the antenna can be increased.

In addition, when the antenna device 1 includes the case 60, it may be preferable that the inside of the case 60 is filled with a sealing material 70 such as silicon. The sealing material 70 corresponds to a sealing member. According to the configuration in which the case 60 is filled with the sealing material 70, the sealing material 70 located above the opposing conductive plate 30 suppresses the wraparound of the vertical polarization of the ground plate from the end portion of the opposing conductive plate 30 to the upper side, so that it has the effect of improving the radiation gain in the horizontal direction of the antenna. In the case 60, at least a side surface portion and an upper surface portion may be made of a resin or ceramic having a predetermined relative permittivity. Further, according to the configuration in which the sealing material 70 is filled in the case 60, waterproofness, dustproofness, and vibration resistance can be improved.

Figure 15:
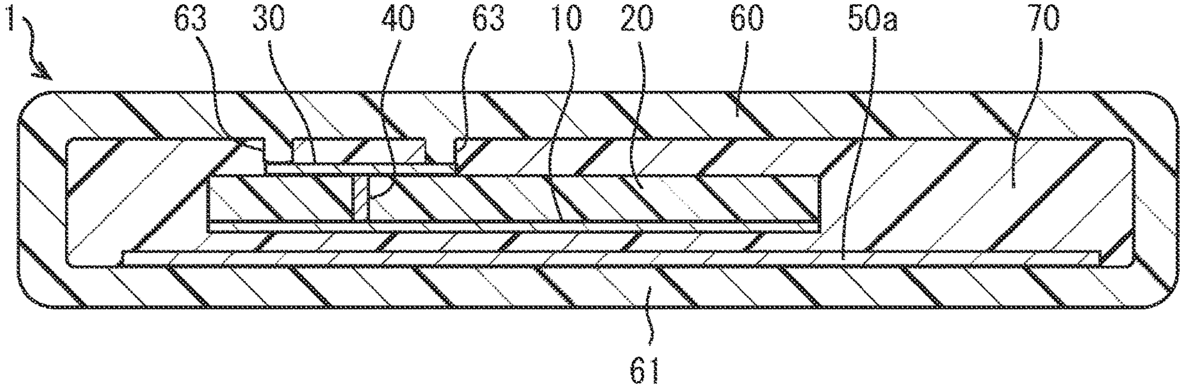
FIG. 15 is a diagram showing a modification example of the antenna device.

In addition, as shown in FIG. 15, the case top plate portion 63 may be formed with an upper rib 631 that comes into contact with the edge portion of the opposing conductive plate 30. The upper rib 631 has a convex structure formed downward on the inner side surface of the case top plate portion 63. The upper rib 631 is provided so as to come into contact with the edge portion of the opposing conductive plate 30. The upper rib 631 fixes the position of the support plate 20 in the case 60, suppresses the wraparound of the vertical polarization of the ground plate from the end of the opposing conductive plate 30 to the upper side, and improves the radiation gain in the horizontal direction of the antenna. A metal pattern such as copper foil may be arranged to the vertical surface (that is, the outer surface) of the upper rib 631 that is connected to the edge of the opposing conductive plate 30.

Since the case 60 and the master ground plate 50*a* have independent configurations, only one of them can be attached. For example, the antenna device 1 may include a case 60 without the master ground plate 50*a*. Filling of the sealing material 70 when the antenna device 1 includes the case 60 may not be an essential element. The upper rib 631 may be also an optional element. As the sealing material 70, a urethane resin such as polyurethane pre-polymer can be used. Here, as the sealing material 70, various other materials such as epoxy resin and silicone resin can be adopted. The case top plate portion 63, the upper rib 631, and the sealing material 70 correspond to a configuration (hereinafter, radio wave shield) that suppresses the vertical electric field radiated by the LC resonance mode from wrapping around from the edge portion of the opposing conductive plate 30 to the upper side. The configuration disclosed as the second modification corresponds to a configuration in which a radio wave shield body configured by using a conductor or a dielectric material is arranged on the upper side of the opposing conductive plate 30.

The case 60 including the upper rib 631 and the sealing material 70 may preferably have a high relative permittivity and a small dielectric loss tangent. For example, it may be preferable that the relative permittivity is 2.0 or more and the dielectric loss tangent is 0.03 or less. When the dielectric loss tangent is high, the amount of radiant energy lost as heat loss increases. Therefore, it may be preferable that the case 60 and the sealing material 70 are realized by using a material having a smaller dielectric loss tangent. Further, the case 60 and the sealing material 70 function so as to much suppress the wraparound of the electric field as the dielectric constant increases. In other words, the higher the dielectric constant of the case 60 and the sealing material 70, the better the gain improving effect in the horizontal direction of the antenna. Therefore, it may be preferable that the case 60 and the sealing material 70 are made of a dielectric having a high dielectric constant.

Either one of the case bottom 91 and the case top plate 93 included in the case 90 may be omitted. When either the upper side or the lower side of the case 90 is omitted (that is, when it becomes an opening), the sealing material 70) may be preferably realized by using a resin that maintains solidity in the range assumed as the temperature of the environment in which the antenna device 1 is used (hereinafter, the operating temperature range). The operating temperature range can be, for example, −30° C. to 100° C.

Third Modified Example

Figure 16:
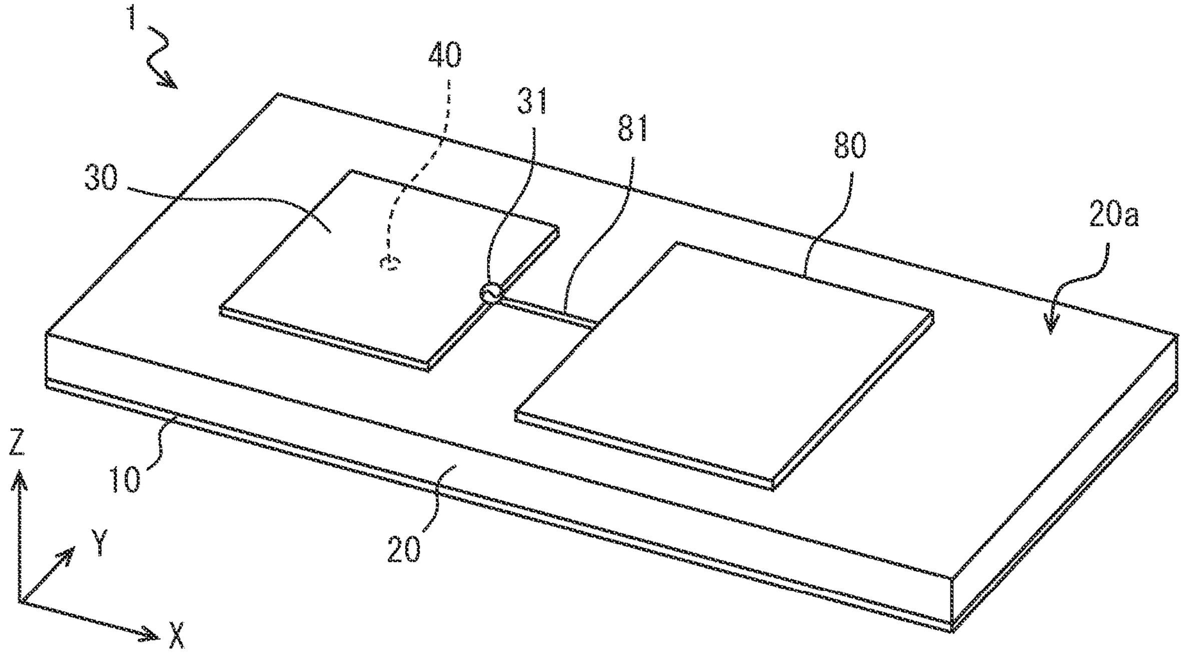
FIG. 16 is a diagram showing a modification example of the antenna device.
Figure 17:
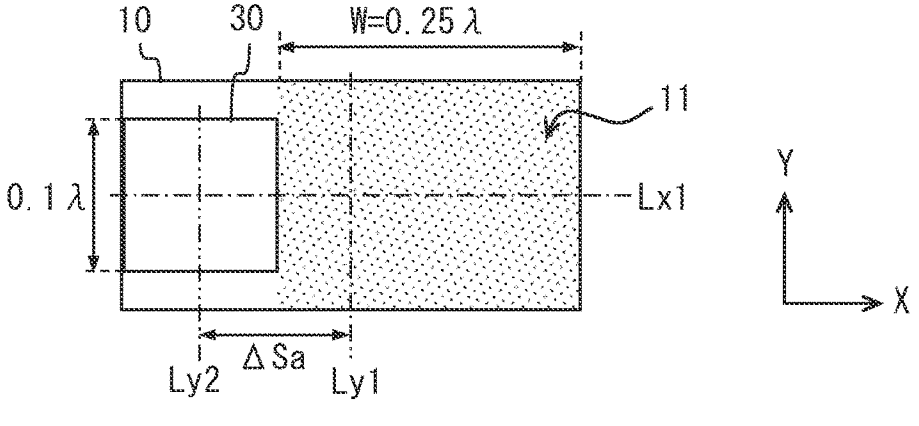
FIG. 17 is a diagram showing a configuration in which a circuit portion is formed on an upper side surface of a support plate.

As shown in FIG. 16, a circuit unit 80 including a modulation/demodulation circuit, a power supply circuit, and the like may be formed on the surface of the support plate 20 on the side where the opposing conductive plate 30 is arranged (hereinafter, the upper side surface 20*a* of the support plate). The circuit unit 80 is an electrical assembly of various parts such as an IC, an analog circuit element, and a connector. This configuration corresponds to a configuration in which the antenna device 1 is realized by arranging the ground plate 10, the opposing conductive plate 30, the short-circuit portion 40, and the circuit unit 80 on the printed circuit board as the support plate 20. Reference numeral 81 in FIG. 16 indicates a micro-strip line for supplying electric power to the opposing conductive plate 30. The circuit unit 80 may be formed in, for example, a region located above the asymmetric portion 11 on the upper side surface 20*a* of the support plate.

Fourth Modified Example

The arrangement mode of the opposing conductive plate 30 with respect to the ground plate 10 may not be limited to the configuration disclosed as the embodiment. The opposing conductive plate 30 may be arranged at a position deviated from a position concentric with the ground plate 10. As the arrangement mode of the opposing conductive plate 30 with respect to the ground plate 10, various arrangement modes can be adopted as illustrated in FIGS. 17 to 20. In FIGS. 17 to 20, the support plate 20 is drawn to be transparent (that is, not shown) in order to clarify the positional relationship between the ground plate 10 and the opposing conductive plate 30. In each drawing, the area corresponding to the asymmetrical portion 11 is provided with a dot pattern hatching as in FIG. 7. The dimensions of each drawing are examples and can be changed as appropriate.

Figure 18:
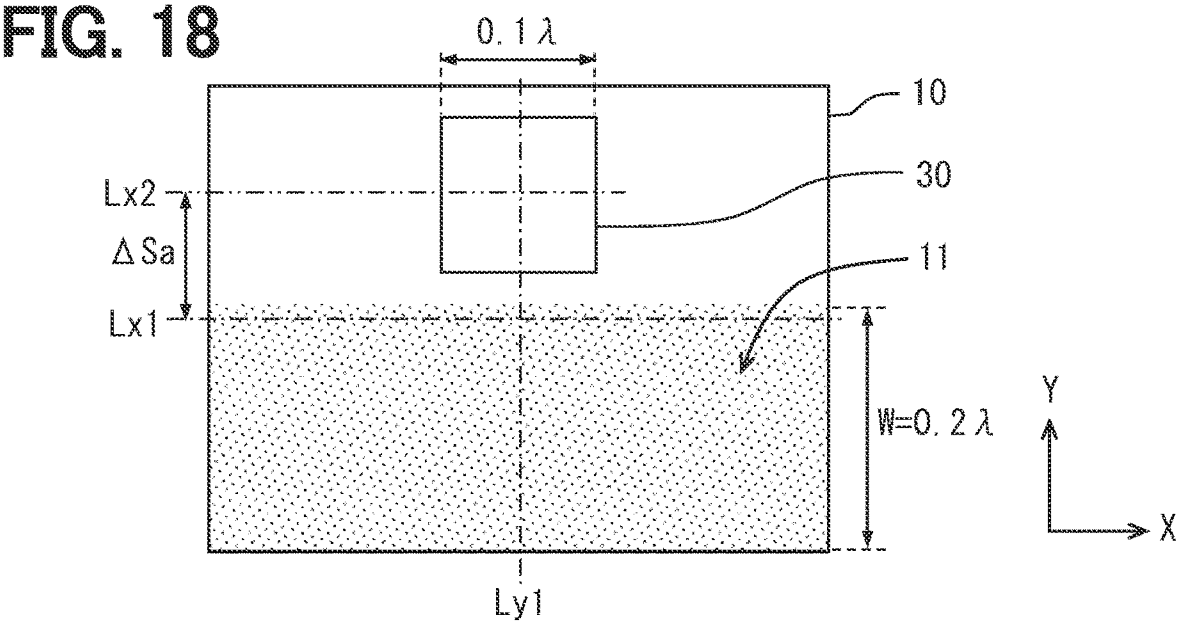
FIG. 18 is a diagram showing a modification example of the antenna device.
Figure 19:
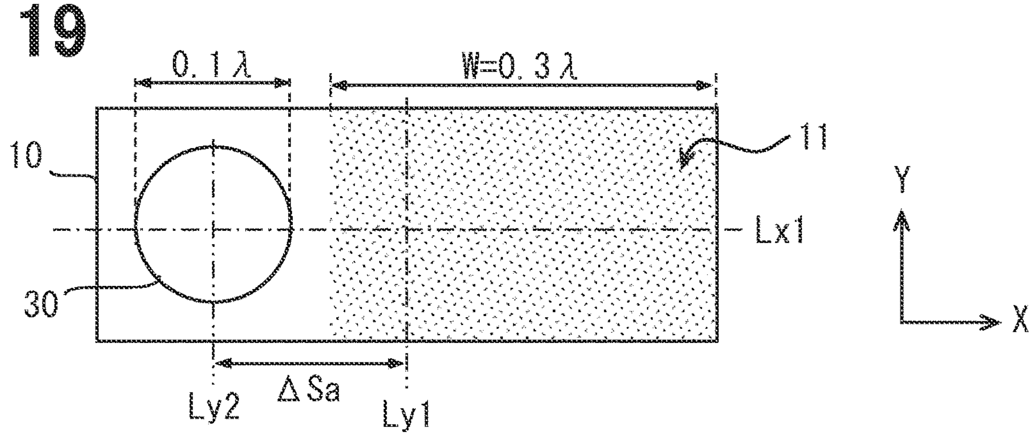
FIG. 19 is a diagram showing a modification example of the antenna device.

Note that Lx2 shown in FIG. 18 shows a straight line passing through the center of the opposing conductive plate 30 and parallel to the X axis. The configuration disclosed in FIG. 18 corresponds to a configuration in which the opposing conductive plate 30 is arranged so as to be displaced by a predetermined amount in the Y-axis direction from a position concentric with the ground plate 10. The conductor plate offset direction, which is the direction in which the opposing conductive plate 30 is offset with respect to the ground plate 10, may not be necessarily limited to the longitudinal direction of the ground plate 10 (that is, the X-axis direction). The conductor plate offset direction may be the lateral direction of the ground plate 10. The conductor plate offset direction corresponds to the direction in which the asymmetrical portion 11 of the ground plate 10 is disposed when viewed from the opposing conductive plate 30. FIG. 19 illustrates an embodiment in which the opposing conductive plate 30 is formed in a circular shape. As described above, various shapes can be adopted for the ground plate 10 and the opposing conductive plate 30.

Figure 20:
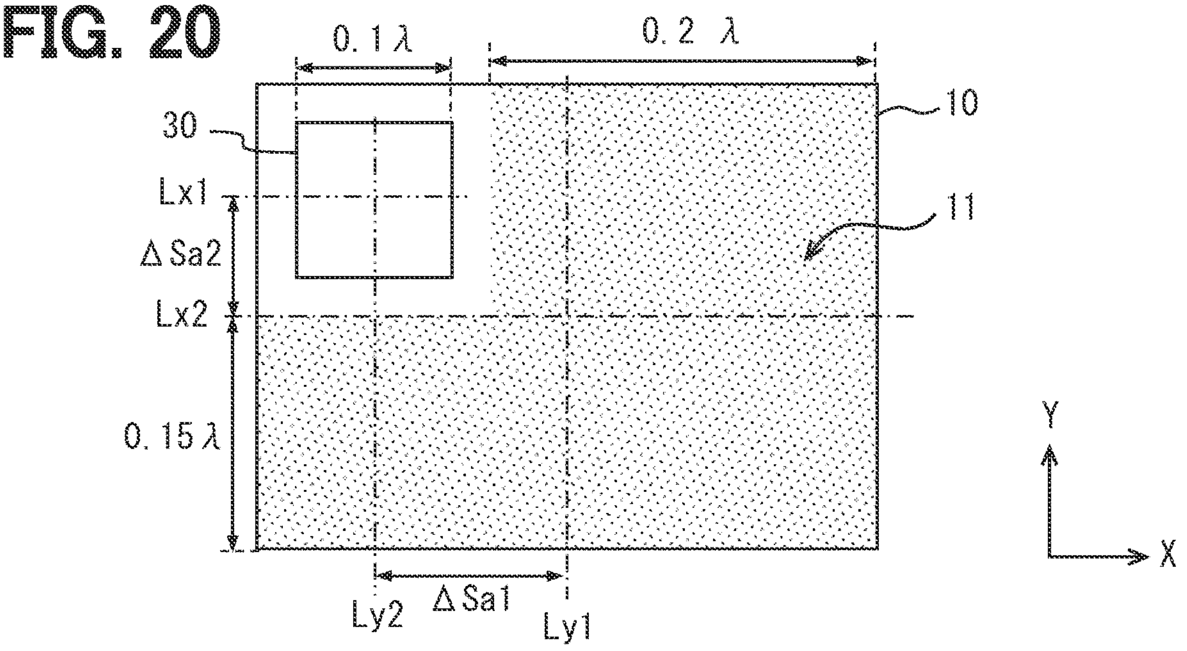
FIG. 20 is a diagram showing a modification example of the antenna device.

Further, as shown in FIG. 20, according to the configuration in which the asymmetrical portions 11 are provided in the X-axis direction and the Y-axis direction, respectively, the edge portion parallel to the X-axis and the edge portion parallel to the Y-axis function as radiating elements. ΔSa1 in FIG. 20 represents the ground plate offset amount ΔSa in the X-axis direction, and ΔSa2 represents the ground plate offset amount ΔSa in the Y-axis direction. ΔSa1 and ΔSa2 may have the same value or different values.

According to the configuration shown in FIG. 20, both the X-axis parallel polarization and the linear polarization whose electric field vibration direction is parallel to the Y-axis (hereinafter, Y-axis parallel polarization) can be radiated upward on the antenna. Specifically, diagonally polarized waves formed by synthesizing X-axis parallel polarization according to ΔSa1 and Y-axis parallel polarization according to ΔSa2 can be radiated. By adjusting the ratio of ΔSa and ΔSa2, the ratio of the X-axis parallel polarization and the Y-axis parallel polarization constituting the diagonally polarized wave can be arbitrarily adjusted. The configuration shown in FIG. 20 corresponds to a configuration in which the opposing conductive plate 30 is displaced by a predetermined amount in the X-axis direction from a position concentric with the ground plate 10 and further displaced by a predetermined amount in the Y-axis direction.

Fifth Modification

Figure 21:
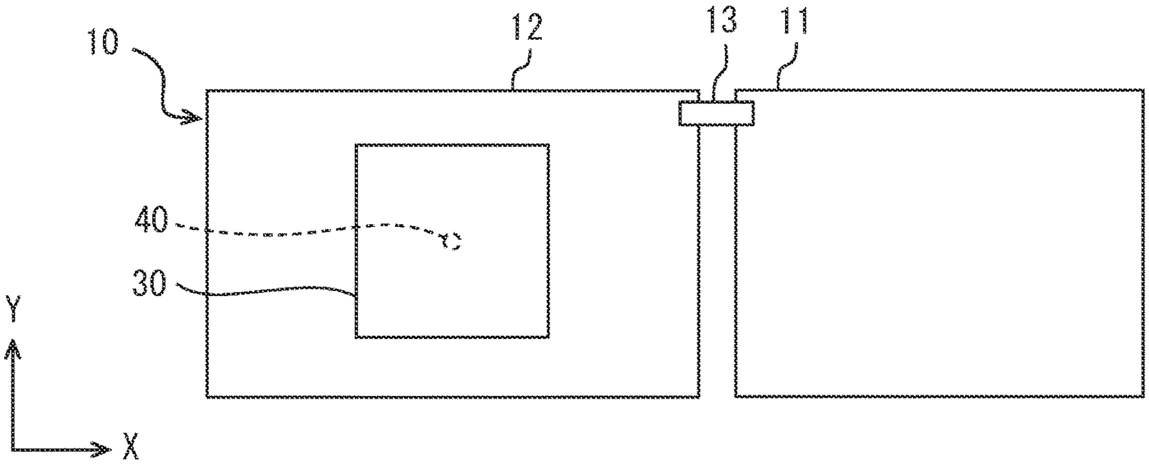
FIG. 21 is a diagram showing a configuration of a ground plate in which a connection state between a symmetry maintain portion and an asymmetric portion is switchable.

The symmetry maintain portion 12 and the asymmetric portion 11 may be physically separated as shown in FIG. 21, and the electrical connection state between the two portions may be switchable by using a switch 13. The separation between the symmetry maintain portion 12 and the asymmetric portion 11 may be set to a value that does not cause electromagnetic coupling at the target frequency, based on the simulation. When the switch 13 is set to be off, the antenna device 1 operates only in LC resonance mode. When the switch 13 is set to be ON, the antenna device 1 operates in both the LC resonance mode and the ground plate excitation mode. According to this configuration, it is possible to control whether or not the antenna device 1 operates in the ground plate excitation mode by turning the switch 13 on and off. In the configuration of this modification, the asymmetric portion width W may be preferably set to an integral multiple of λ/4, such as λ/4 or λ/2. According to such a setting, the gain as the ground plate excitation mode can be increased.

Sixth Modified Example

Figure 22:
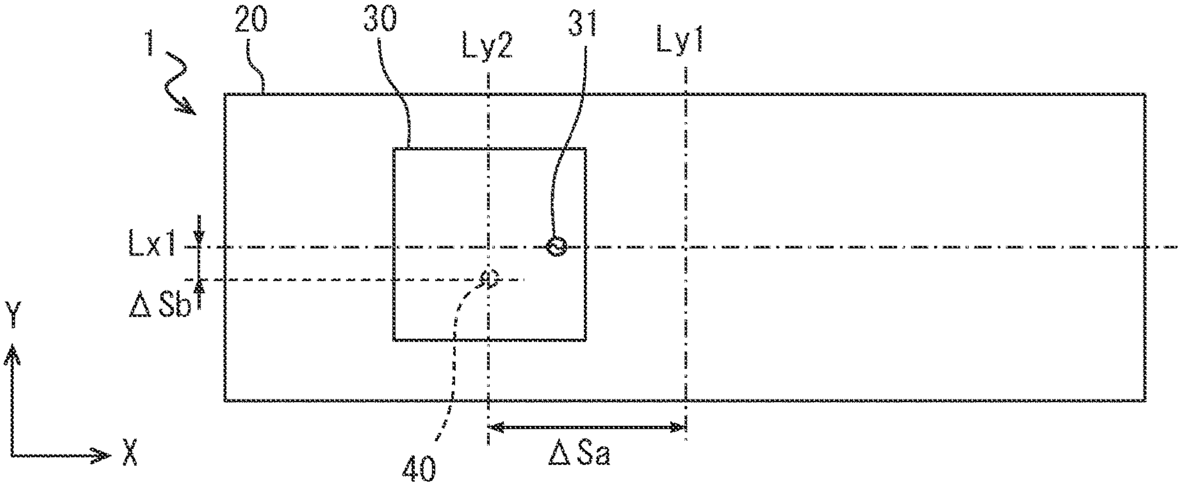
FIG. 22 is a diagram showing an antenna device in which a short-circuit portion is provided at a position deviated from the center of the opposing conductive plate.

As shown in FIG. 22, the short-circuit portion 40 may be arranged at a position deviated from the center of the opposing conductive plate 30 by a predetermined amount (hereinafter, a short-circuit portion offset amount ΔSb) in the Y-axis direction. According to this configuration, the symmetry of the current distribution on the opposing conductive plate 30 is broken, and linearly polarized waves parallel to the Y-axis direction are radiated from the opposing conductive plate 30. Specific examples are as follows.

Figure 23:
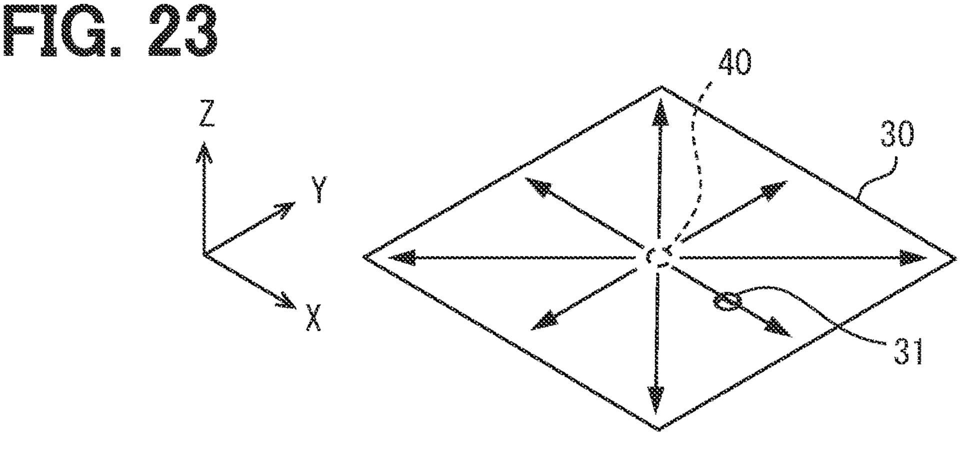
FIG. 23 is a diagram showing a current distribution on an opposing conductive plate when a short-circuit portion is formed in the center of the opposing conductive plate.

In the configuration in which the short-circuit portion 40 is arranged at the center of the opposite conductive plate 30 as in the antenna device 1 of the first embodiment, the current flowing through the opposite conductive plate 30 is symmetric with a center on the short-circuit portion 40 as shown in FIG. 23. Therefore, the radio waves generated by the current flowing in a certain direction when viewed from the connection point of the opposing conductive plate 30 (hereinafter, the short-circuited point) between the short-circuit portion 40 and the opposing conductive plate 30 are canceled by the radio waves generated by the current flowing in the opposite direction.

Figure 24:
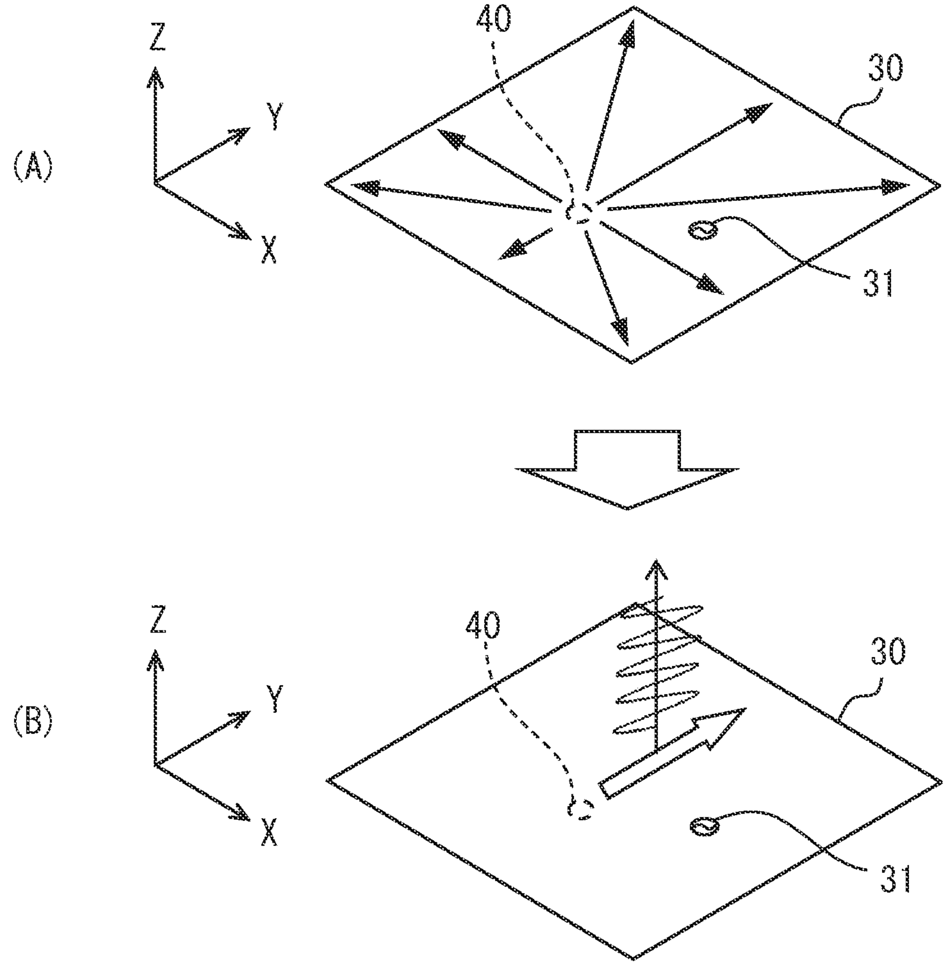
FIG. 24 is a diagram for explaining a current distribution on the opposing conductive plate and its operation when a short-circuit portion is formed at a position spaced apart from the center of the opposing conductive plate.

On the other hand, in the configuration in which the short-circuit portion 40 is arranged at a position deviated by a predetermined amount in the Y-axis direction from the center of the opposing conductive plate 30, the symmetry in the current distribution flowing through the opposing conductive plate 30 as shown in (A) of FIG. 24 is broken. Therefore, as shown in FIG. 6B, the radio waves radiated by the current component in the Y-axis direction remain uncancelled. That is, in the configuration in which the short-circuit portion 40 is arranged at a position deviated by a predetermined amount in the Y-axis direction from the center of the opposing conductive plate 30, the linearly polarized waves in which the electric field vibrates in the parallel direction along the Y-axis are radiated upward from the opposing conductive plate 30. Since the symmetry of the current component in the X-axis direction is maintained, the linearly polarized waves in which the electric field oscillates in the X-axis direction cancel each other. That is, the linearly polarized wave whose electric field oscillates in the X-axis direction is not radiated from the opposing conductive plate 30.

Of course, according to the above configuration, the vertical polarization of the ground plate in the horizontal direction of the antenna is radiated by the parallel resonance of the capacitance formed between the opposing conductive plate 30 and the ground plate 10 and the inductance provided by the short-circuit portion 40. That is, according to the above configuration, the vertical polarization of the ground plate in the horizontal direction of the antenna, the X-axis parallel polarization in the upward direction of the antenna, and the Y-axis parallel polarization in the upward direction of the antenna can be radiated at the same time. The X-axis parallel polarization radiation in the upward direction of the antenna is provided by the asymmetric portion 11 of the ground plate 10. The emission of Y-axis parallel polarization in the upward direction of the antenna is provided by the offset arrangement of the short-circuit portion 40 in the Y-axis direction.

The direction of shifting the short-circuit portion 40 with respect to the center of the opposing conductive plate 30 (hereinafter, the short-circuit portion offset) may be a direction orthogonal to the conductor plate offset direction. According to this configuration, it is possible to radiate two types of linearly polarized waves whose electric field vibration directions are orthogonal to each other as linearly polarized waves radiated upward on the antenna.

The short-circuit portion 40 may be formed in a center region of the opposing conductive plate 30. The short-circuit offset amount ΔSb may be preferably set to 0.04λ or less in order to maintain all-around directionality (in other words, omni-directionality) in the horizontal direction of the antenna. It may be preferable that the short-circuit offset amount ΔSb is 0.02λ (=2.5 mm) or less, for example, 0.004λ (=0.5 mm), 0.008λ (=1.0 mm), 0.012λ (=1.5 mm), etc. By changing the short-circuit offset amount ΔSb, the radiation gain of Y-axis parallel polarization in the upward direction of the antenna can be adjusted. Further, the operating frequency does not change even when the short-circuit offset amount ΔSb is changed. When the position of the power supply point 31 is fixed, the voltage standing wave ratio (VSWR) may fluctuate according to the short-circuit portion offset amount ΔSb. Here, since the power supply point 31 can be set to an arbitrary position, the VSWR at the target frequency can be suppressed to a practical level (for example, 3 or less) by providing the power supply point 31 at a position corresponding to the short-circuit offset amount ΔSb. That is, the return loss can be suppressed to a desired allowable level by adjusting the position of the power supply point 31 according to the position of the short-circuit portion 40.

Second Embodiment

Figure 25:
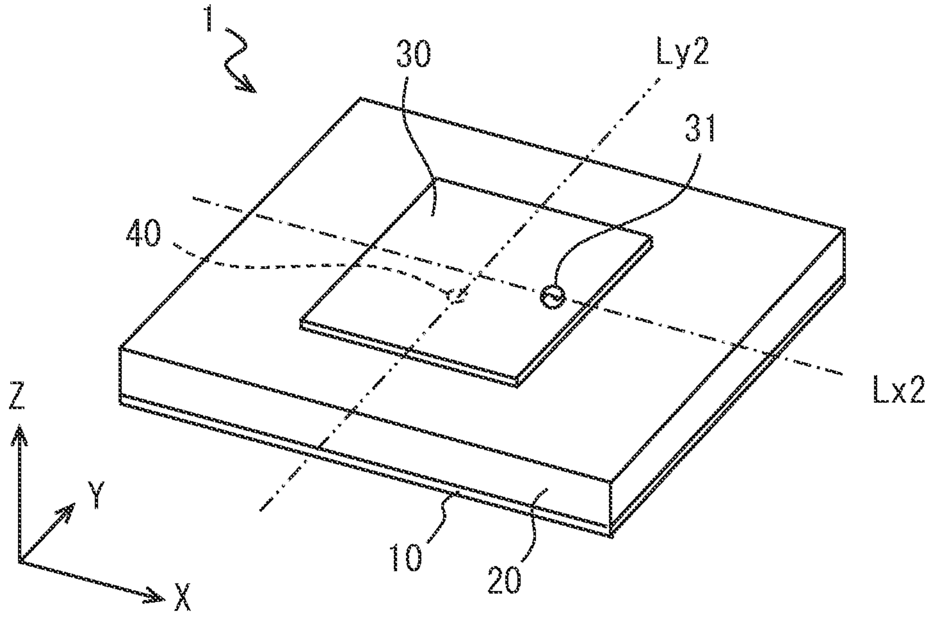
FIG. 25 is an external perspective view showing the configuration of the antenna device of the second embodiment.
Figure 26:
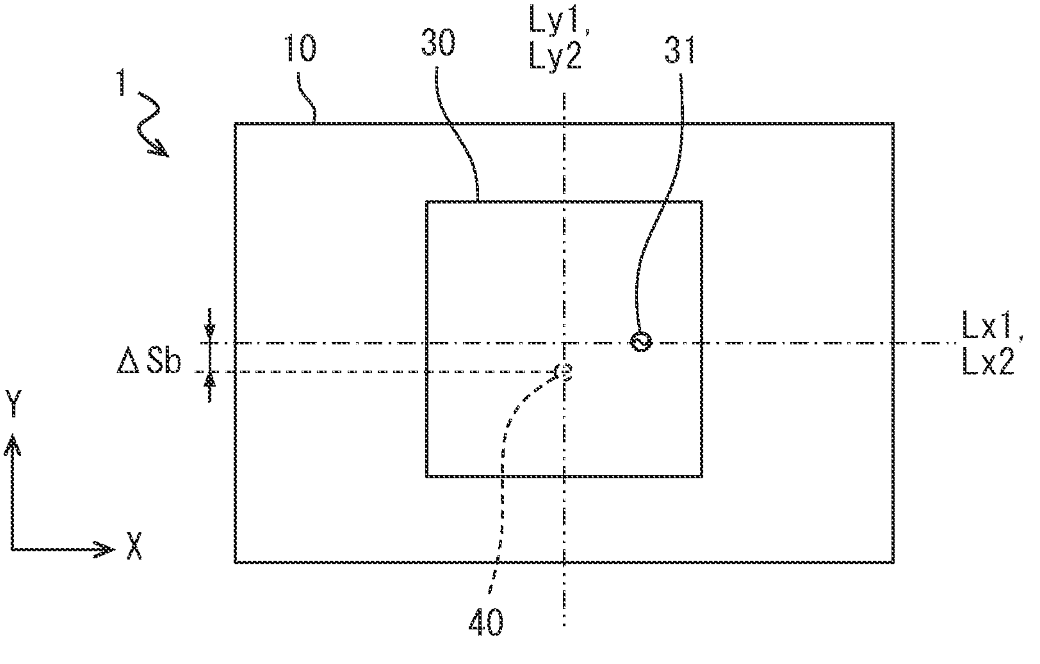
FIG. 26 is a top view for explaining the positional relationship between the ground plate, the opposing conductive plate, and the short-circuit portion.

In the first embodiment described above, the configuration is disclosed under a condition that the opposing conductive plate 30 is arranged at a position deviated from the center of the ground plate 10, alternatively, the configuration of the antenna device 1 may not be limited to this feature. When the antenna device 1 has the configuration disclosed in the modified example 6, the opposing conductive plate 30 may be arranged at a position concentric with the ground plate 10 as shown in FIGS. 25 and 26. In other words, in the configuration in which the short-circuit portion 40 is arranged at a position deviated from the center of the opposing conductive plate 30, the ground plate 10 may not always have the asymmetric portion 11. Lx2 and Ly2 shown in FIG. 25 indicate the axes of symmetry of the opposing conductive plate 30. Lx1 and Ly1 shown in FIG. 26 indicate the axis of symmetry of the ground plate 10.

As disclosed in the first and second embodiments, the radiation of parallel polarization of the ground plate in the upward direction of the antenna may be realized by using at least one of the configuration in which the short-circuit portion 40 is arranged so as to be offset from the center of the opposing conductive plate 30 in the direction along the axis of symmetry, and the configuration in which the asymmetrical portion 11 is added to the ground plate 10. As another aspect, as disclosed in Japanese Patent Application Laid-Open No. 2016-15688 incorporated herein by reference, a configuration (hereinafter referred to as a comparative configuration) is also conceivable such that the opposing conductive plate 30 operates as a patch antenna by arranging the second power supply point on the axis of symmetry of the opposing conductive plate 30. Here, in the comparative configuration, two power supply points are required, which complicates the circuit. On the other hand, according to the configurations of the first and second embodiments, the opposing conductive plate 30 may have only one power supply point, so that the circuit configuration can be simplified.

Although the present disclosure has been described in accordance with the examples, it is understood that the present disclosure is not limited to such examples or structures. The present disclosure also encompasses various modified examples and modifications within a uniform range. In addition, various combinations and forms, and further, other combinations and forms including only one element, or more or less than these elements are also within the sprit and the scope of the present disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An antenna device comprising:

a ground plate made of a conductor with a flat plate shape;

an opposing conductive plate made of another conductor with a flat plate shape, arranged to space apart from the ground plate by a predetermined distance, and having a power supply point electrically connected to a power supply line; and a short-circuit portion arranged in a central region of the opposing conductive plate and electrically connecting the opposing conductive plate and the ground plate, wherein:

a parallel resonance at a predetermined target frequency is generated by an inductance provided in the short-circuit portion and a capacitance between the ground plate and the opposing conductive plate;

the ground plate is asymmetrically arranged with respect to the opposing conductive plate; each of the ground plate and the opposing conductive plate is arranged in a shape symmetrical with respect to two straight orthogonal lines;

the opposing conductive plate has an entire surface facing the ground plate;

a center of the opposing conductive plate does not overlap with a center of the ground plate; and the opposing conductive plate is offset with respect to the ground plate by a predetermined amount in a longitudinal direction and a lateral direction of the ground plate to provide an asymmetrical portion of the ground plate.

2. The antenna device according to claim 1, wherein:

the ground plate has a rectangular shape; and the opposing conductive plate is arranged at a position shifted in a longitudinal direction of the ground plate from a position where the opposing conductive plate and the ground plate are concentric.

3. The antenna device according to claim 2, wherein:

the opposing conductive plate is arranged at a position deviated by a predetermined amount in the longitudinal direction of the ground plate from the center of the ground plate.

4. The antenna device according to claim 1, wherein:

the opposing conductive plate is arranged at a position deviated by a predetermined amount from the center of the ground plate in each of a longitudinal direction and a lateral direction of the ground plate.

5. The antenna device according to claim 1, wherein:

the short-circuit portion is arranged at a position spaced apart by a predetermined amount from the center of the opposing conductive plate.

6. The antenna device according to claim 1, wherein:

the ground plate has a rectangular shape;

the opposing conductive plate is arranged at a position deviated from the center of the ground plate in a longitudinal direction of the ground plate; and the short-circuit portion is arranged at a position deviated by a predetermined amount in a lateral direction of the ground plate from a position where the opposing conductive plate and the ground plate are concentric.

7. The antenna device according to claim 6, wherein:

the short-circuit portion is arranged at a position deviated by a predetermined amount in the lateral direction of the ground plate from the center of the ground plate.

8. The antenna device according to claim 1, further comprising:

a radio wave shield body for shielding a propagation of an electric field, which is made of a conductor or a dielectric material, and arranged on an upper side of the opposing conductive plate.

9. The antenna device according to claim 1, wherein:

the power supply point is arranged on one of the two straight orthogonal lines of the opposing conductive plate.

10. The antenna device according to claim 1, wherein;

the two straight orthogonal lines of the ground plate intersect at the center of the ground plate and the two straight orthogonal lines of the opposing conductive plate intersect at the center of the opposing conductive plate.

* * * * *